METHOD AND APPARATUS FOR PERFORMING ARITHMETICAL OPERATIONS IN THE SYSTEM OF RESIDUAL CLASSES

Filed Dec. 8, 1960 15 Sheets-Sheet 1

INVENTORS
WALTER HOFFMANN
HELMUTH E. MÜLLER
BY Francis J. Thomas
ATTORNEY

| MOD 11 | | A | B | C | D | E | F | G | H | I | J | K | L | M | N | O | P | Q | R | S | T | U | V | LINE |
|---|---|---|---|---|---|---|---|---|---|---|---|---|---|---|---|---|---|---|---|---|---|---|---|---|
| VALID FOR ADDITION | X | * | 0 | 1 | 2 | 3 | 4 | 5 | 6 | 7 | 8 | 9 | 10 | * | * | * | * | * | * | * | * | * | * | 1 |
| | Y | * | 0 | 1 | 2 | 3 | 4 | 5 | 6 | 7 | 8 | 9 | 10 | * | * | * | * | * | * | * | * | * | * | 2 |
| | Z | * | 0 | 1 | 2 | 3 | 4 | 5 | 6 | 7 | 8 | 9 | 10 | 0 | 1 | 2 | 3 | 4 | 5 | 6 | 7 | 8 | 9 | 3 |
| VALID FOR SUB-TRACTION | X | * | 0 | 1 | 2 | 3 | 4 | 5 | 6 | 7 | 8 | 9 | 10 | * | * | * | * | * | * | * | * | * | * | 4 |
| | Y | * | 0 | 10 | 9 | 8 | 7 | 6 | 5 | 4 | 3 | 2 | 1 | * | * | * | * | * | * | * | * | * | * | 5 |
| | Z | * | 0 | 1 | 2 | 3 | 4 | 5 | 6 | 7 | 8 | 9 | 10 | 0 | 1 | 2 | 3 | 4 | 5 | 6 | 7 | 8 | 9 | 6 |
| VALID FOR MULTI-PLICATION | X | 0 | 1 | 2 | 4 | 8 | 5 | 10 | 9 | 7 | 3 | 6 | * | * | * | * | * | * | * | * | * | * | * | 7 |
| | Y | 0 | 1 | 2 | 4 | 8 | 5 | 10 | 9 | 7 | 3 | 6 | * | * | * | * | * | * | * | * | * | * | * | 8 |
| | Z | 0 | 1 | 2 | 4 | 8 | 5 | 10 | 9 | 7 | 3 | 6 | 1 | 2 | 4 | 8 | 5 | 10 | 9 | 7 | 3 | * | * | 9 |
| VALID FOR FORMAL DIVISION | X | 0 | 1 | 2 | 4 | 8 | 5 | 10 | 9 | 7 | 3 | 6 | * | * | * | * | * | * | * | * | * | * | * | 10 |
| | Y | * | 1 | 6 | 3 | 7 | 9 | 10 | 5 | 8 | 4 | 2 | * | * | * | 0 | * | * | * | * | * | * | * | 11 |
| | Z | 0 | 1 | 2 | 4 | 8 | 5 | 10 | 9 | 7 | 3 | 6 | 1 | 2 | 4 | 8 | 5 | 10 | 9 | 7 | 3 | * | * | 12 |

FIG. 4b

Jan. 26, 1965 W. HOFFMANN ET AL 3,167,645

METHOD AND APPARATUS FOR PERFORMING ARITHMETICAL OPERATIONS IN THE SYSTEM OF RESIDUAL CLASSES

Filed Dec. 8, 1960 15 Sheets-Sheet 7

MOD 7 : $\frac{(a+b)c}{d}$

EXAMPLE : $\frac{(3+5)2}{5} \equiv 6 (\text{mod } 7)$ 3,167,645

METHOD AND APPARATUS FOR PERFORMING ARITHMETICAL OPERATIONS IN THE SYSTEM OF RESIDUAL CLASSES

Walter Hoffmann, Rueschlikon, Zurich, Switzerland, and Hellmuth E. Müller, Solna, Sweden, assignors to International Business Machines Corporation, New York, N.Y., a corporation of New York Filed Dec. 8, 1960, Ser. No. 74,516
Claims priority, application Switzerland, Dec. 30, 1959, 82,488/59
2 Claims. (Cl. 235—156)

Figure 1A:
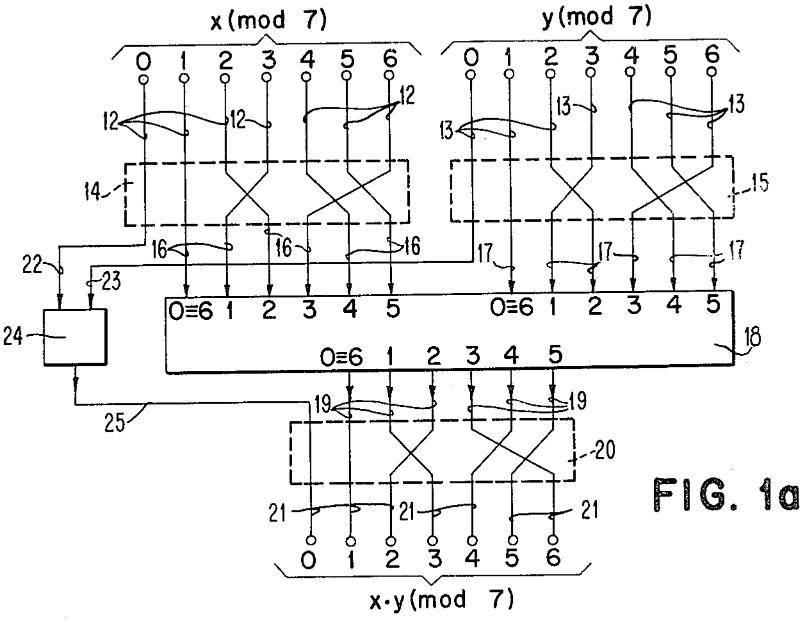

This invention relates to a method for performing arithmetical operations in the System of Residual Classes, in the following abbreviated by SRC and describes computing devices for carrying out said method, especially, devices for multiplications and divisions modulo any arbitrary prime numbers, making use of the index calculus known in the number theory.

The proposal to represent numbers in the System of Residual Classes for performing arithmetical operations in computing machines has already been made. A. Svoboda discussed some characteristics of the SRC number representation in comparison to the conventional polyadic (e.g. decimal or binary) representation of numbers in an article entitled "Rational Numerical System of Residual Classes," published in the Czechoslovakian periodical "Stroje na Zpracování Informací" (Machines for Information Processing), by the Czechoslovakian Academy of Sciences, Prague, 1957, vol. 5 p. 937. Independently, the representation of numbers in the System of Residual Classes with regard to its applicability in computers was also investigated by H. L. Garner. These findings were published in an article entitled "The Residue Number System," in the "IRE Transactions on Electronic Computers," vol. EC–8, June 1959, pp. 140–147.

In order to get acquainted with the SRC number representation and the SRC arithmetic, some facts of elementary number theory and some of the achieved results outlined in the above publications are summarized.

The System of Residual Classes is developed from the properties of linear congruences. In the congruence:

$$A \equiv a \pmod{m}$$

(which reads: A is congruent $a$ modulo $m$), $a$ is the residue (remainder) of the number A, after dividing A by the modulus $m$. A, $a$ and $m$ are integers.

In order to represent a number X in the System of Residual Classes, a plurality of $n$ mutually prime moduli $p_i$ is chosen, and the $n$ congruences $$X \equiv x_i \pmod{p_i};\ i=1, 2, \ldots n$$

are written to stand for the number X. The number X is represented in an unequivocal manner if X is smaller than the period P of the System of Residual Classes, P being defined as the product of the chosen moduli $p_i$.

The range of unequivocal SRC number representation for X is determined by:

$$0 \leq X < P = \pi_i p_i;\ i=1, 2 \ldots n$$

A special problem of the SRC arithmetic for which solutions are already known presents itself in the way of assuring a unique representation of the result of an arithmetical operation to be performed, also in case of exceeding the above defined range. However, this problem shall not be taken up in the following, because it has no direct relationship to the subject of the present invention.

As an example, the five moduli $p_i=3, 5, 7, 11, 13$ are chosen which define the period $P=15015$, which is the product of 3, 5, 7, 11 and 13. Thus, in the example, every number below 15015 is uniquely described with these five moduli. In this system a number, e.g. $X=12329$ is unequivocally expressed by the following set of congruences:

$$12329 \equiv 2 \pmod{3}$$
$$12329 \equiv 4 \pmod{5}$$
$$12329 \equiv 2 \pmod{7}$$
$$12329 \equiv 9 \pmod{11}$$
$$12329 \equiv 5 \pmod{13}$$

This is usually written in table form as follows:

| $p_i$ | 3 | 5 | 7 | 11 | 13 |
|---|---|---|---|---|---|
| X=12329 | 2 | 4 | 2 | 9 | 5 |

Due to the computation rules for linear congruences, well known in number theory, addition, subtraction and multiplication of two SRC represented numbers are performed by modulo $p_i$ addition, subtraction or multiplication, respectively, of its corresponding residues independently from each other in each of the $p_i$-columns.

Addition and multiplication in the System of Residual Classes are demonstrated by concrete examples as follows.

ADDITION

| $p_i$ | 3 | 5 | 7 | 11 | 13 |
|---|---|---|---|---|---|
| X=139 | 1 | 4 | 6 | 7 | 9 |
| Y=107 | 2 | 2 | 2 | 8 | 3 |
| X+Y=246 | 0 | 1 | 1 | 4 | 12 |

MULTIPLICATION

| $p_i$ | 3 | 5 | 7 | 11 | 13 |
|---|---|---|---|---|---|
| X=139 | 1 | 4 | 6 | 7 | 9 |
| Y=107 | 2 | 2 | 2 | 8 | 3 |
| Z=X·Y=14873 | 2 | 3 | 5 | 1 | 1 |

The solution of the congruence:

$$ax \equiv b \pmod{p};\ a \neq 0,\ p \text{ prime}$$

henceforth shall be called "formal division." Hereby, the integer value:

$$x \equiv \frac{b}{a} \pmod{p}$$

is obtained which should be called "formal quotient," in contrast to the numerical value $$\frac{b}{a}$$

Reference is made to an example in which, disregarding the well known difficulties of the SRC division process per se, it may be assumed that a dividend Z is integrally divisible by a divisor Y. This assumption does not limit the understanding of the general inventive idea.

DIVISION

| $p_i$ | 3 | 5 | 7 | 11 | 13 |
|---|---|---|---|---|---|
| Z=14873 | 2 | 3 | 5 | 1 | 1 |
| Y=107 | 2 | 2 | 2 | 8 | 3 |
| X=Z:Y=139 | 1 | 4 | 6 | 7 | 9 |

The residues of the quotient are obtained by independent formal SRC division in each of the columns associated with the respective moduli $p_i$. They constitute, when taken as a whole set, a correct SRC representation of the quotient X if—as previously assumed—X becomes an integer.

The formal division does not lead to any definite result in those $p_i$-columns in which the divisor has a residue 0. However, as known from SRC arithmetic, the set of the remaining well defined quotient residues is sufficient to unequivocally express the quotient.

As known in the art, arithmetical operations in the System of Residual Classes are presently performed by table reading, and separate arithmetic units and table reading means are required for performing e.g. addition and multiplication.

A primary object of the present invention is to provide apparatus for performing arithmetical operations in the System of Residual Classes which shows similar advantages as logarithmic computations. According to the invention, the carrying out of higher degree arithmetical operations, particularly multiplications and formal divisions in the System of Residual Classes, is reduced to simple additive operations.

Another object of the invention is the design of arithmetic units wherein multiplications and formal divisions are performed in linear computing means by superimposing certain physical realizable entities.

It is a further object of the present invention to design arithmetic units which remain essentially unchanged for performing all basic SRC arithmetical operations.

The basic idea of the present invention is the utilization of the index calculus.

The indices, introduced by Leonhard Euler in 1772 and since that time well known in number theory, are derived from the power series of the primitive roots $g$. Using the notation generally adopted today, a primitive root $g$ is defined by $$g^{\frac{p-1}{2}} \equiv -1 \pmod{p}, \text{ for primes } p>2$$

Since all terms of the power series $g^1, g^2, g^3, \ldots g^{p-1}$ (mod $p$) are relatively prime to $p$ and hence are congruent to the terms of a reduced system of residues modulo $p$, every number $a$ non-divisible by $p$ is congruent to a power of $g$ modulo $p$ as follows:

$$a \equiv g^v \pmod{p}$$

The exponent $v$ of the primitive root $g$ is called the "index of $a$" (denoted by "ind $a$").

A table of indices for prime numbers up to 1000 was published by Carl G. J. Jacobi as early as 1839.

In the following, there may be considered a sequence of indices for a prime number, e.g. $p=11$. The prime number $p=11$ has four primitive roots namely, $$g_1=2,\ g_2=6,\ g_3=7, \text{ and } g_4=8$$

Here, the power series $g^v \equiv a$ (mod $p$) is developed for the smallest primitive root $g_1=2$:

$2^1 \equiv 2$ (mod 11)
$2^2 \equiv 4$ (mod 11)
$2^3 \equiv 8$ (mod 11)
$2^4 \equiv 5$ (mod 11)
$2^5 \equiv 10$ (mod 11)
$2^6 \equiv 9$ (mod 11)
$2^7 \equiv 7$ (mod 11)
$2^8 \equiv 3$ (mod 11)
$2^9 \equiv 6$ (mod 11)
$2^{10} \equiv 1$ (mod 11)
$2^{11} \equiv 2$ (mod 11)
$2^{12} \equiv 4$ (mod 11)
$2^{13} \equiv 8$ (mod 11)
etc.

This may suitably be written in table form:

| V=ind $a$ | 1 | 2 | 3 | 4 | 5 | 6 | 7 | 8 | 9 | 10 | 11 | 12 | 13 | etc. |
|---|---|---|---|---|---|---|---|---|---|---|---|---|---|---|
| $a$ | 2 | 4 | 8 | 5 | 10 | 9 | 7 | 3 | 6 | 1 | 2 | 4 | 8 | |

This table shows that the number sequence for the numbers $a$ is repeated after ten terms.

In the following, a table of indices is given for the primes $p$ ranging from $p=3$ to $p=17$. This table is based on the smallest primitive roots belonging to the respective primes. In this table, and in this discussion the term "number" is used to refer to a residue number (or residue).

INDEX TABLE

| Smallest Primitive Root | $p$ | Indices: 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| 2 | 3 | 2 | 1 | | | | | | Numbers (Residues) | | | | | | | | |
| 2 | 5 | 2 | 4 | 3 | 1 | | | | | | | | | | | | |
| 3 | 7 | 3 | 2 | 6 | 4 | 5 | 1 | | | | | | | | | | |
| 2 | 11 | 2 | 4 | 8 | 5 | 10 | 9 | 7 | 3 | 6 | 1 | | | | | | |
| 2 | 13 | 2 | 4 | 8 | 3 | 6 | 12 | 11 | 9 | 5 | 10 | 7 | 1 | | | | |
| 3 | 17 | 3 | 9 | 10 | 13 | 5 | 15 | 11 | 16 | 14 | 8 | 7 | 4 | 12 | 2 | 6 | 1 |

It should be pointed out that the above index table is of basic importance for the design of all workable embodiments which will be disclosed in this description. Reference will repeatedly be made to this table.

According to a theorem of number theory, the index of a product is congruent to the sum of the indices of its factors modulo ($p$−1), $p$ being an odd prime. This relation may be written as follows:

$$\text{ind } (x_i \cdot y_i) \equiv (\text{ind } x_i + \text{ind } y_i) \pmod{p_i - 1}$$

Accordingly, the relation between a number and its index is very similar to the relation between a number and its logarithm.

The performance of an SRC multiplication with the aid of the index calculus is now demonstrated by an example whereby it is assumed to multiply $X=139$ by $Y=107$.

SRC NUMBER NOTATION

| $p_i$ | 3 | 5 | 7 | 11 | 13 |
|---|---|---|---|---|---|
| $X$=139 | 1 | 4 | 6 | 7 | 9 |
| $Y$=107 | 2 | 2 | 2 | 8 | 3 |

The indices corresponding to the residues $x_i$ and $y_i$ are taken from the above index table. The indices are summed up modulo ($p_i$−1) in each $p_i$-column independently. Any modulus (column 7) containing a zero in the SRC number notation is disregarded in the subsequent arithmetic and a zero is entered as the residue for that modulus of the product.

INDEX NOTATION

| $p_i$ | 3 | 5 | 7 | 11 | 13 |
|---|---|---|---|---|---|
| ind $x_i$ | 2 | 2 | 3 | 7 | 8 |
| ind $y_i$ | 1 | 1 | 2 | 3 | 4 |
| (ind $x_i$+ind $y_i$)(mod $p_i$−1) | 1 | 3 | 5 | 10 | 12 |

The SRC number notation of the product is obtained by looking up the respective numbers for the corresponding indices at the above index table.

Re-transfer from the Index- into the SRC Number Notation leads to the Product Z:

| $p_i$ | 3 | 5 | 7 | 11 | 13 |
|---|---|---|---|---|---|
| ind ($x_i \cdot y_i$) | 1 | 3 | 5 | 10 | 12 |
| $Z=X \cdot Y$=14873 | 2 | 3 | 5 | 1 | 1 |

Formal SRC division can be performed by index addition, if the residues $y_i$ of the divisor are first transferred into their reciprocals $$\frac{1}{y_i}$$

which are then to be treated like factors. The following relation is valid for residues $y_i \neq 0$:

$$\text{ind } (z_i : y_z) \equiv \left[\text{ind } z_i + \text{ind } \left(\frac{1}{y_i}\right)\right] \pmod{p_i - 1}$$

The performance of an SRC division by applying the index calculus will now be demonstrated by example of the above division. Again there may be $Z=14873$ and $Y=107$. According to the above proposed method, the reciprocals $$\frac{1}{y_i}$$

will first be determined; they are defined by the congruence $$y_i \cdot \left(\frac{1}{y_i}\right) \equiv 1 \pmod{p_i}$$

SRC NUMBER NOTATION

| $p_i$ | 3 | 5 | 7 | 11 | 13 |
|---|---|---|---|---|---|
| Z=14873 | 2 | 3 | 5 | 1 | 1 |
| Y=107 | 2 | 2 | 2 | 8 | 3 |
| $\left(\frac{1}{y_i}\right)$ | 2 | 3 | 4 | 7 | 9 |

The indices of $z_i$ and $$\frac{1}{y_i}$$

are taken from the above index table. Then, they are summed up modulo $(p_i-1)$ in each $p_i$-column independently.

INDEX NOTATION

| $p_i$ | 3 | 5 | 7 | 11 | 13 |
|---|---|---|---|---|---|
| ind $z_i$ | 1 | 3 | 5 | 10 | 12 |
| ind $\left(\frac{1}{y_i}\right)$ | 1 | 3 | 4 | 7 | 8 |
| $\left[\text{ind } z_i+\text{ind}\left(\frac{1}{y_i}\right)\right]$ (mod $p_i-1$) | 2 | 2 | 3 | 7 | 8 |

The re-transfer from the index notation into the SRC number notation is performed with the aid of the index table in the same manner as described before.

Re-transfer from the Index- into the SRC Number Notation leads to the quotient X:

| $p_i$ | 3 | 5 | 7 | 11 | 13 |
|---|---|---|---|---|---|
| ind $(z_i:y_i)$ | 2 | 2 | 3 | 7 | 8 |
| X=Z:Y=139 | 1 | 4 | 6 | 7 | 9 |

It is obvious that the formal SRC division can also be performed by subtracting the corresponding indices according to the following relation which is valid for residues $y_i \neq 0$:

$$\text{ind }(z_i:y_i) \equiv (\text{ind } z_i - \text{ind } y_i)(\text{mod } p_i-1)$$

In general, the inventive method for performing higher degree arithmetical operations in the System of Residual Classes, especially multiplications and divisions of numbers represented by the residues of a plurality of moduli $p_i$, is based on the idea that for each modulus $p_i$, all residues different from zero are represented by entities suitable for procession in computers in such a spatial and/or temporal sequence that the indices, which according to a relationship well known in number theory correspond to said residues, are caused to form an ordinary number sequence, and in that for the purpose of determining the indices of the result said entities are linearly superimposed modulo $(p_i-1)$.

Multiplication and division are based on applications of the quasi-logarithmic properties of the indices and are performed by converting the numbers in the system of residual classes into their corresponding index notation, adding or subtracting said indices, and reconverting the result into a number in the system of residual classes representative of the product or the quotient.

The present invention deals with devices for the accomplishment of the above and related objects comprising arithmetic means adapted to perform the linear superposition modulo of any predetermined number of entities (which are suitable for procession in computers).

The foregoing and other objects, features and advantages of the invention will be apparent from the following more particular description of preferred embodiments of the invention, as illustrated in the accompanying drawings.

Figure 1B:
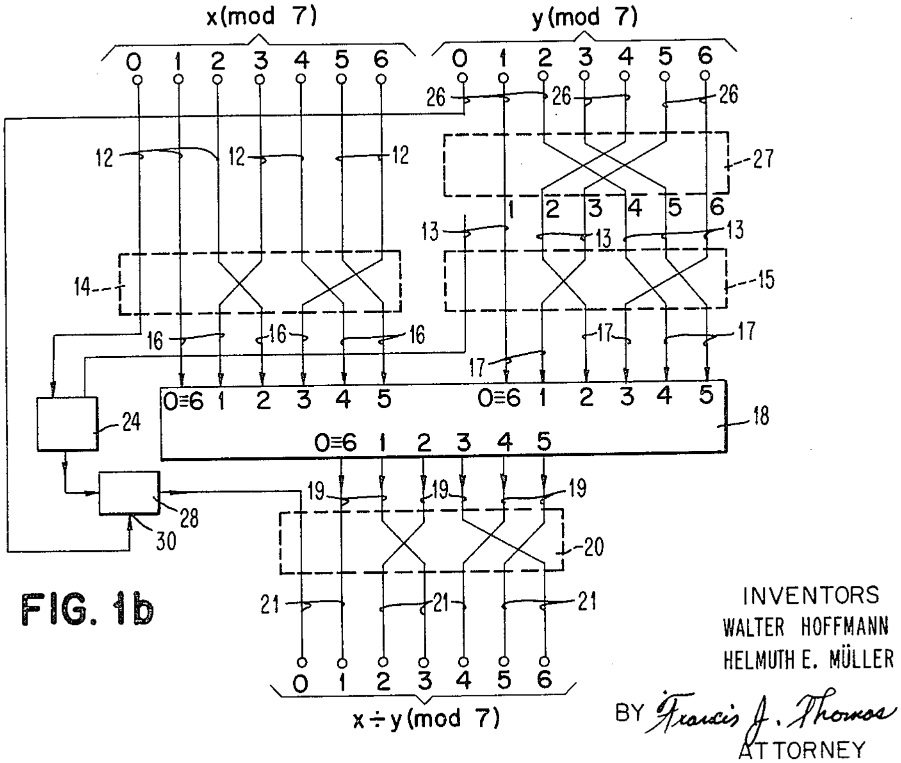
Figure 1C:
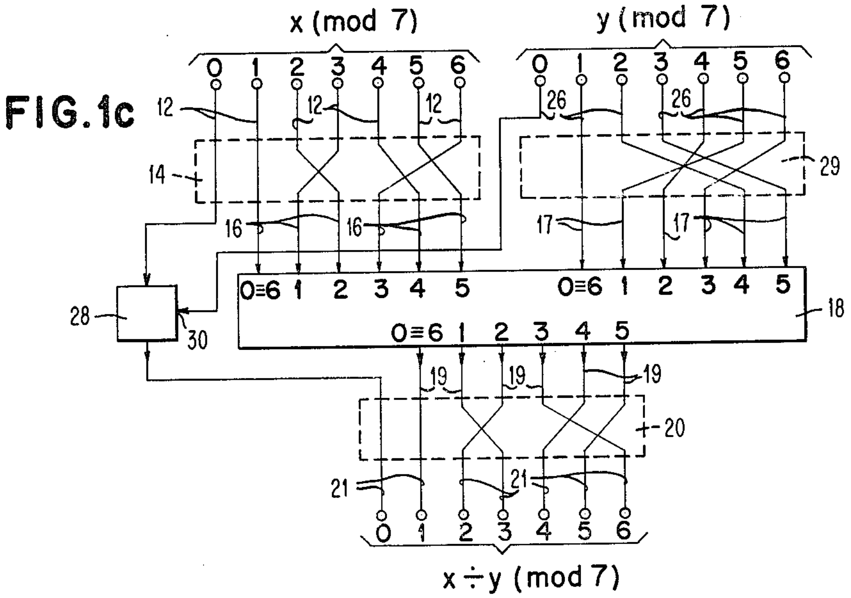
Figure 1D:
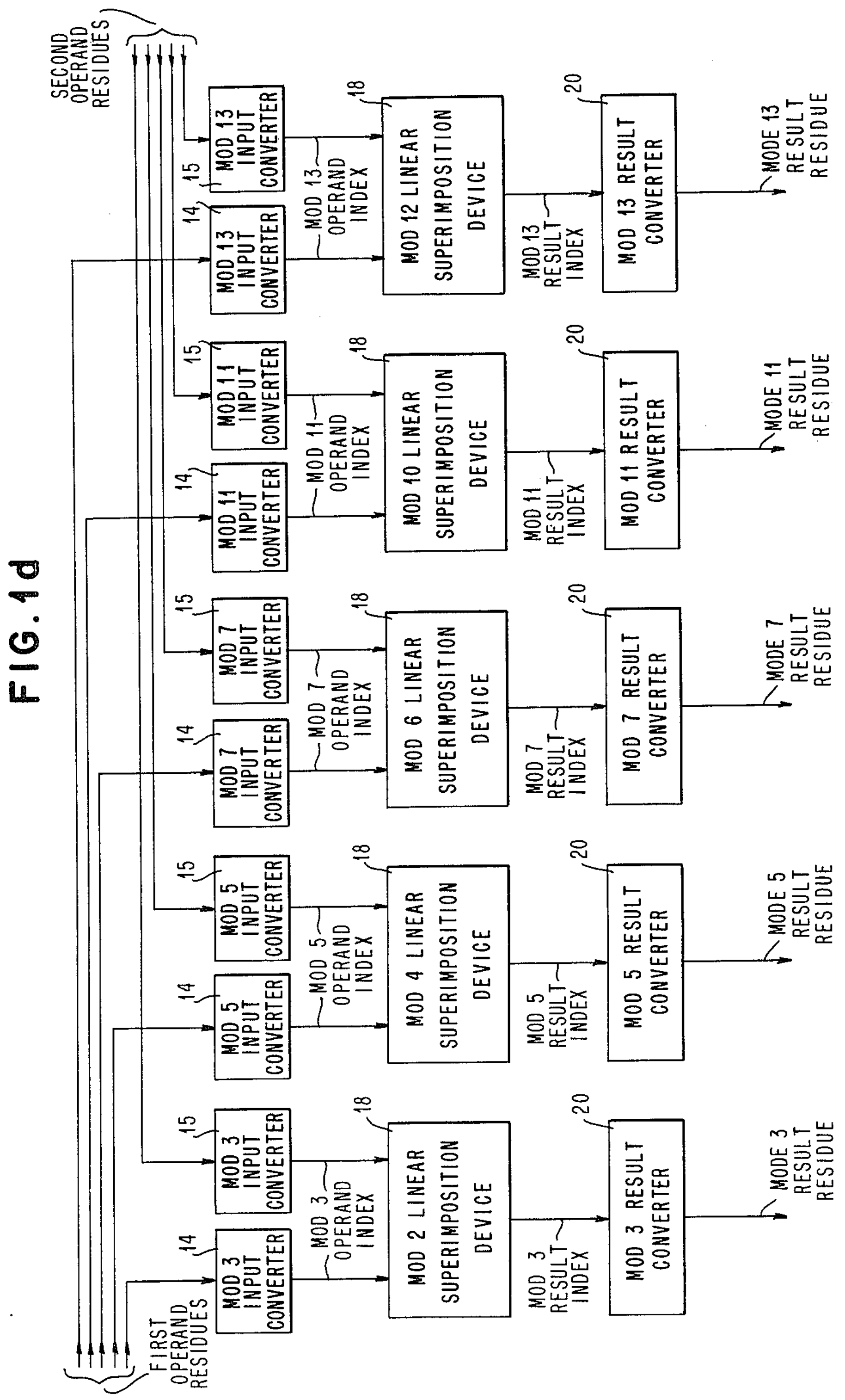

In the drawings:

FIGS. 1*a*, 1*b*, 1*c* and 1*d* are block diagrams to illustrate the principle of the present invention. More specifically, FIG. 1*a* is a block diagram of a SRC multiplying unit modulo 7, FIGS. 1*b* and 1*c* are block diagrams of an arithmetic unit for formal SRC division modulo 7, and FIG. 1*d* is a block diagram of an arithmetic system employing several arithmetic units.

Figure 2A:
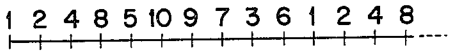

FIG. 2*a* is a diagram of an equidistant scale with a number sequence developed from the index calculus for modulus $p=11$. This scale represents the base for the construction of a SCR slide rule modulo 11.

Figure 2B:
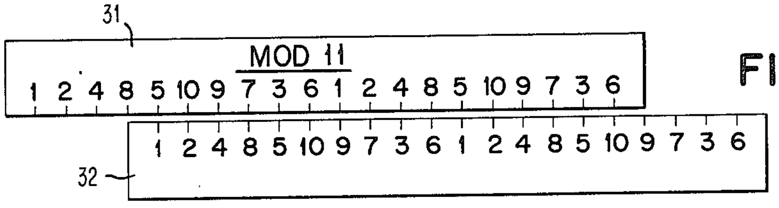
Figure 2C:
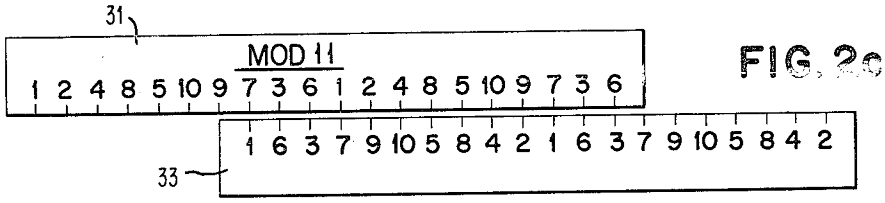

FIGS. 2*b* and 2*c* are SRC slide rules modulo 11.

Figure 3:
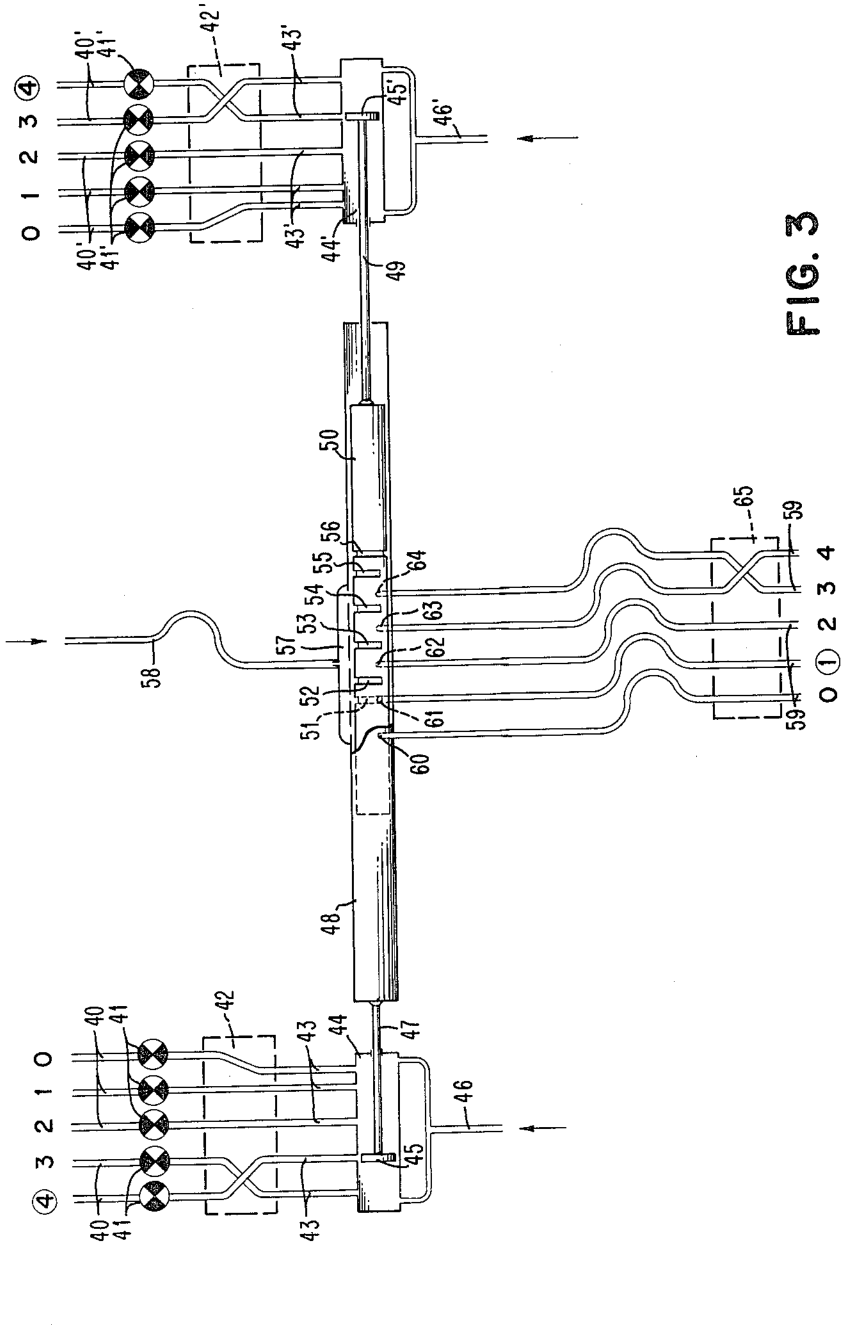

FIG. 3 is a diagram showing a hydraulic SRC multiplying unit modulo 5.

Figure 4A:
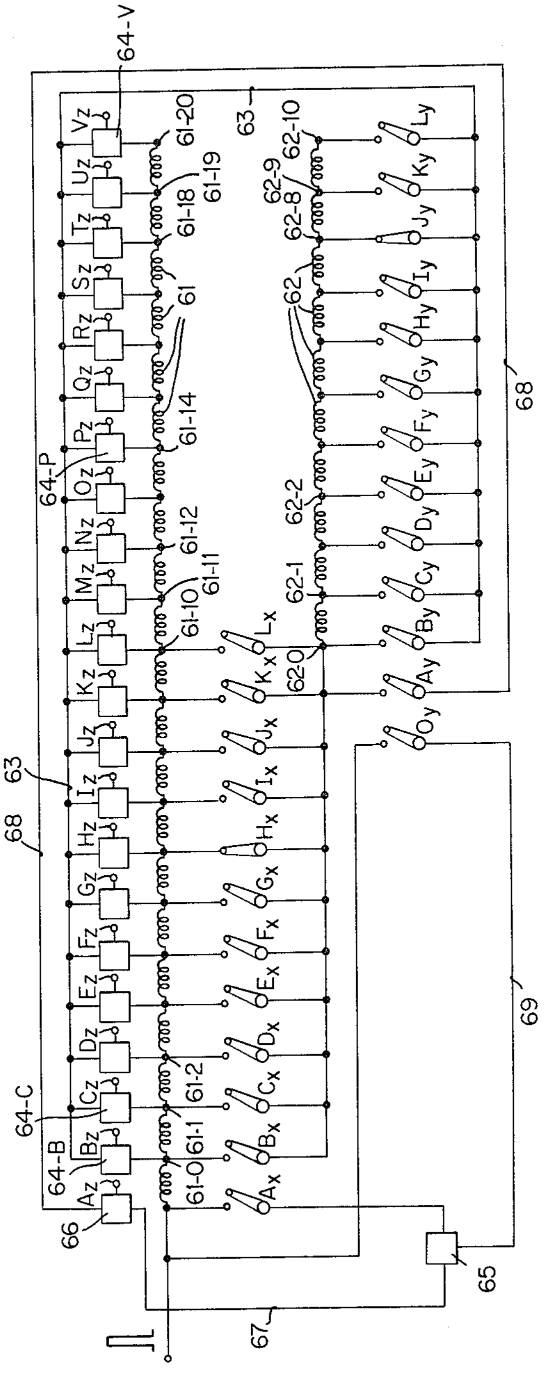

FIG. 4*a* is a diagram depicting an SRC arithmetic unit modulo 11 comprising delay lines, the basic structure of which unit remains essentially unchanged in the performance of additions, subtractions, multiplications or formal divisions in SRC, involving the basic principle of the present invention.

FIG. 4*b* is related to FIG. 4*a* and is a table for associating the respective data values with the input switches and output terminals for performing the SRC arithmetic operations (addition, subtraction, multiplication or formal division) modulo 11.

Figure 5A:
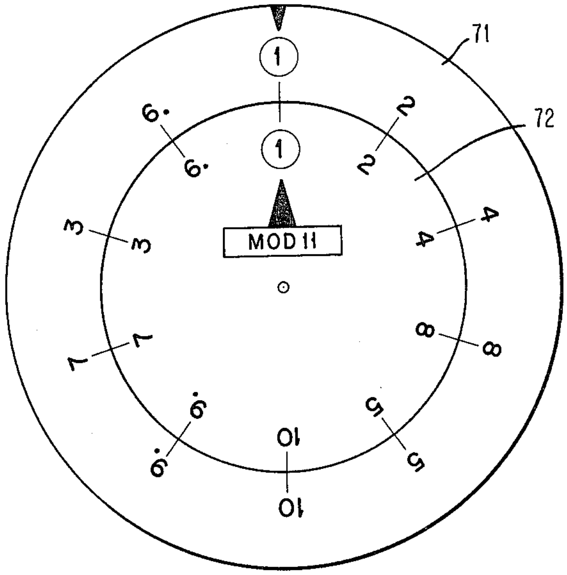
Figure 5B:
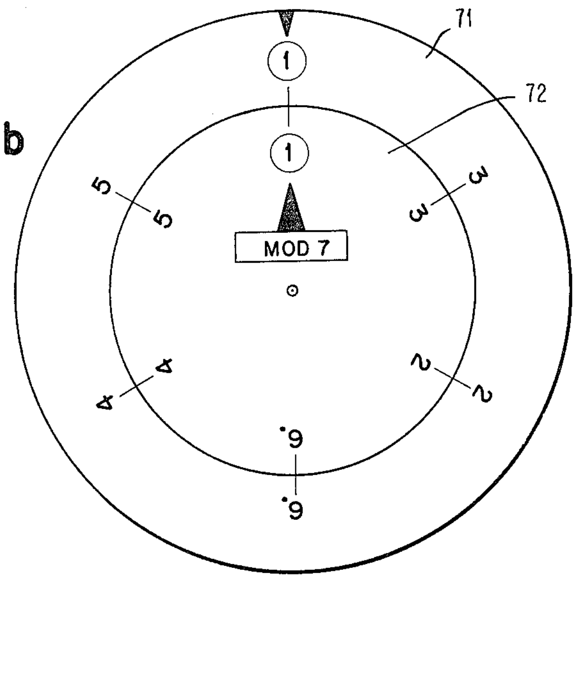

FIGS. 5*a* and 5*b* are diagrams of SRC slide disks modulo 11 and modulo 7, respectively.

Figure 6A:
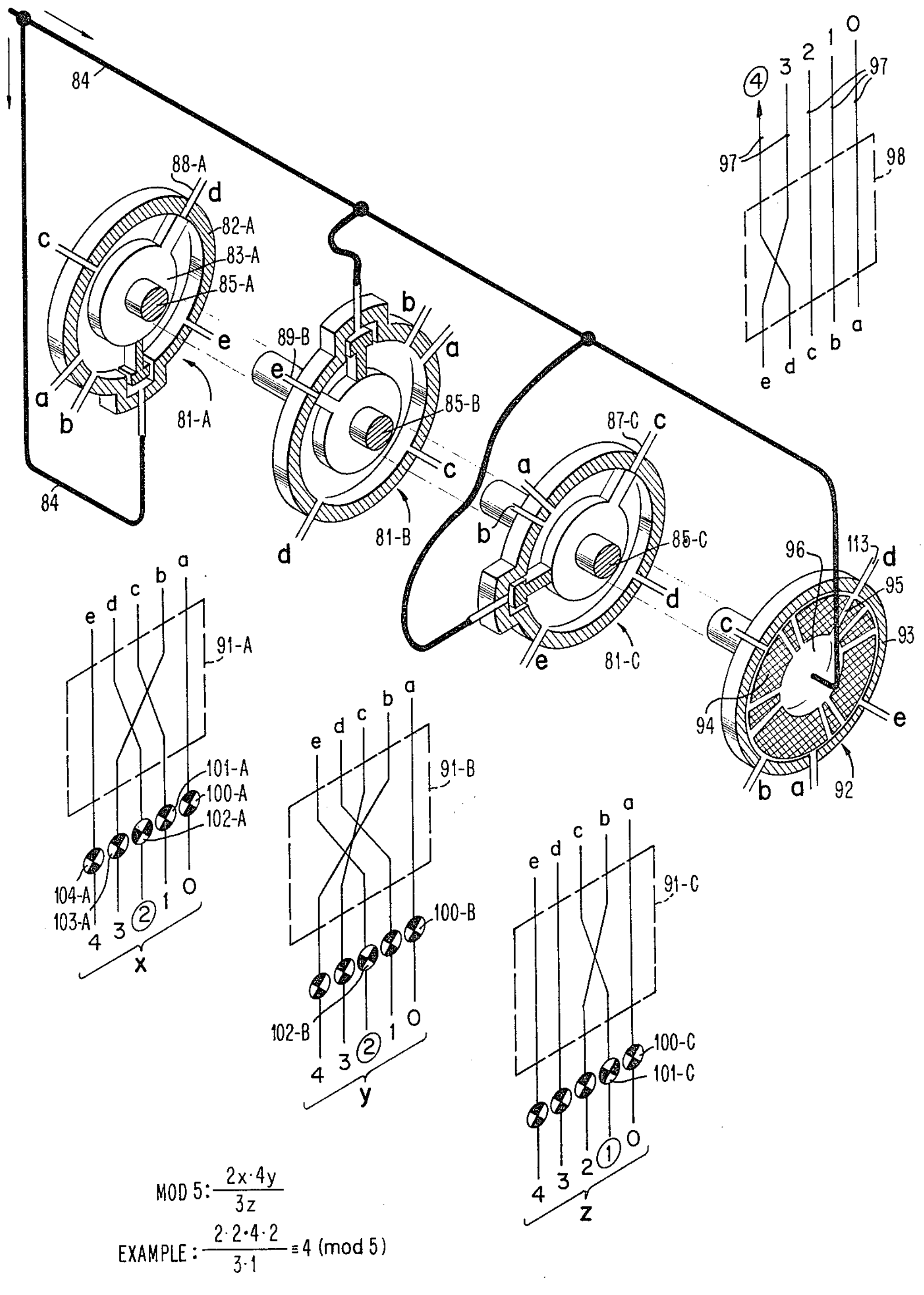
Figure 6B:
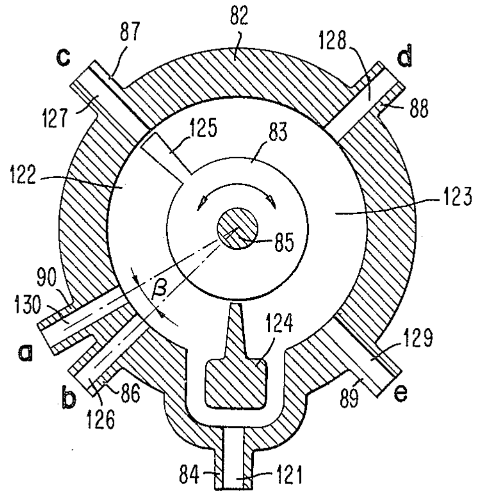
Figure 6C:
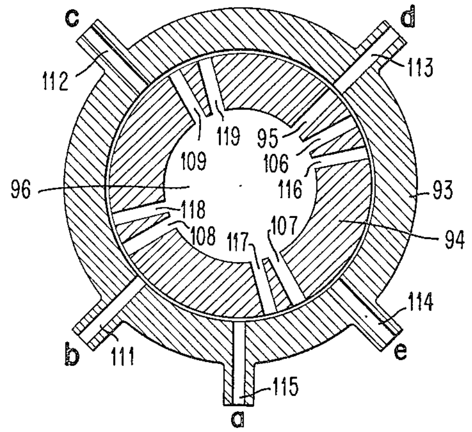

FIGS. 6*a*, 6*b* and 6*c* are diagrams showing a circular arrangement of a hydraulic SRC multiplying/dividing unit modulo 5.

Figure 7:
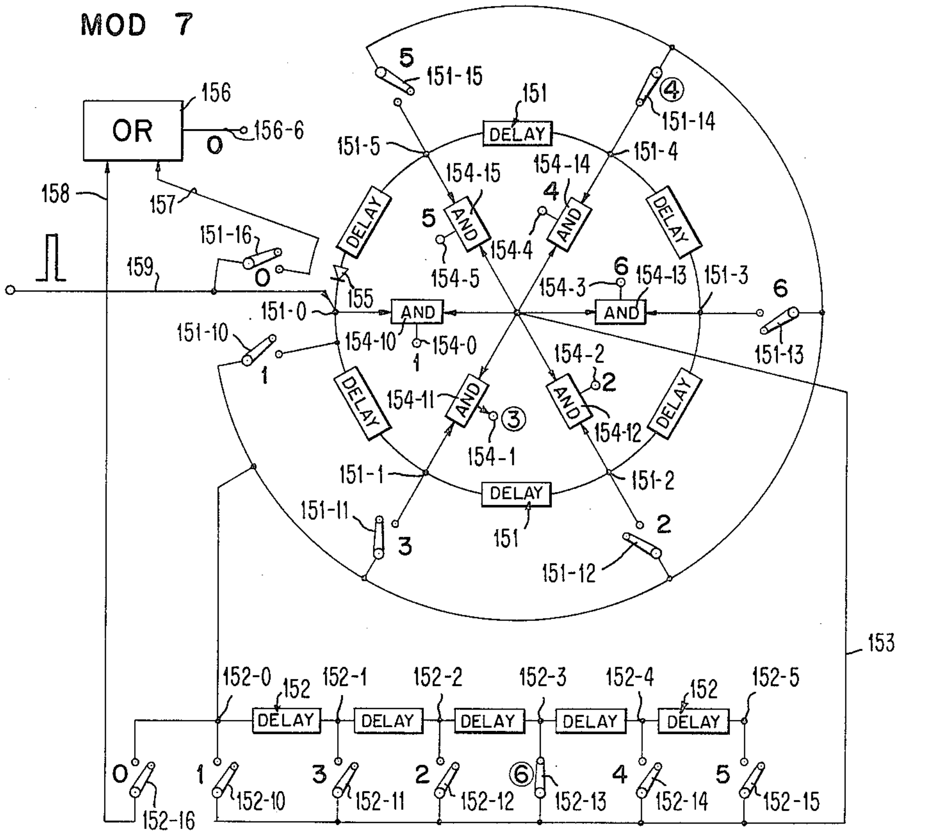

FIG. 7 is a diagram of an SRC multiplying unit modulo 7 comprising delay lines based on the principle of the embodiment disclosed in FIG. 4*a* showing a circular rather than a rectilinear arrangement.

Figure 8A:
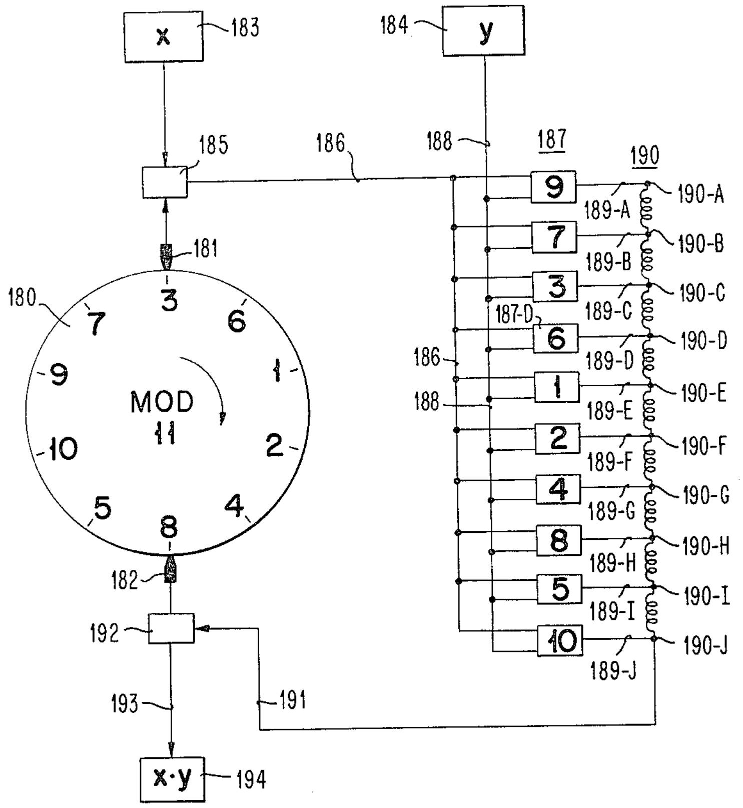
Figure 8B:
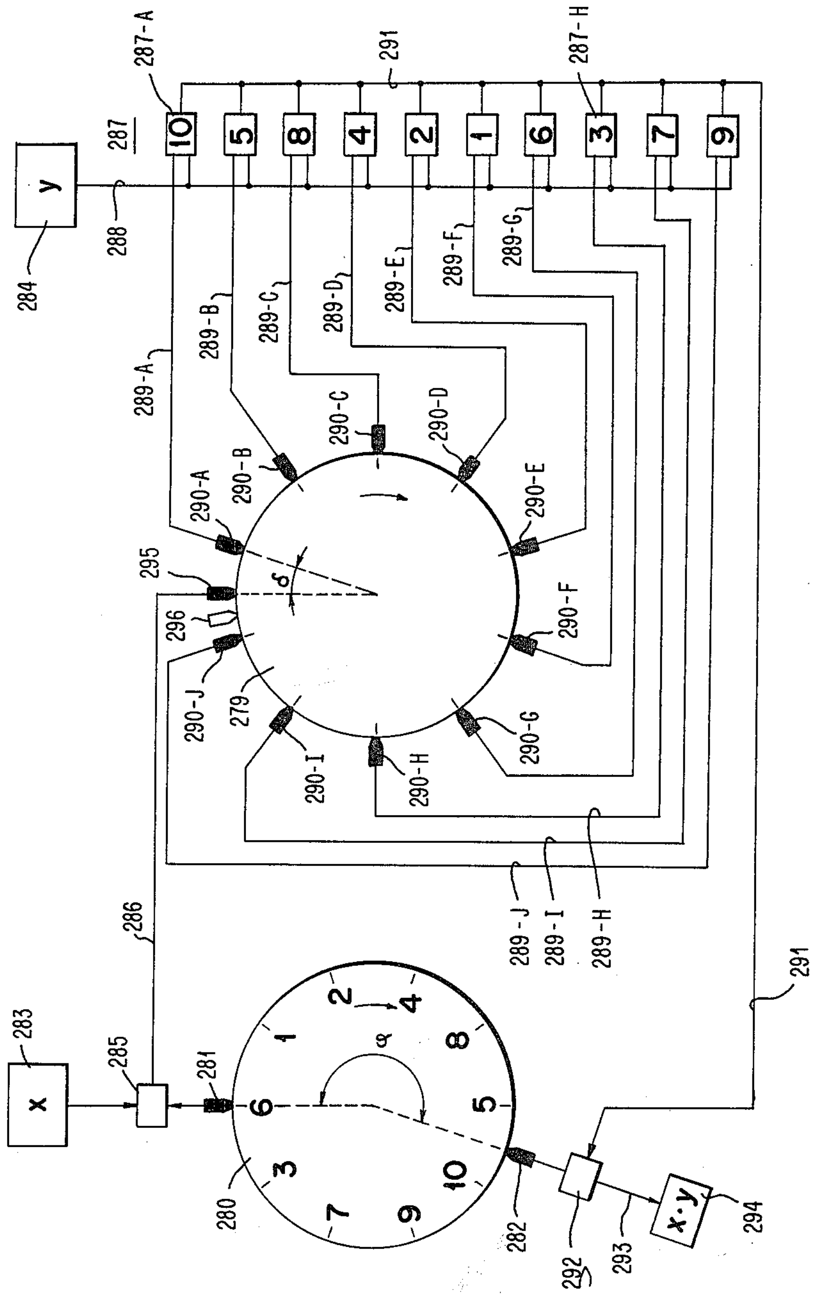

FIGS. 8*a* and 8*b* are diagrams depicting embodiments of the present invention comprising a rotatable permanent storage.

Figure 9:
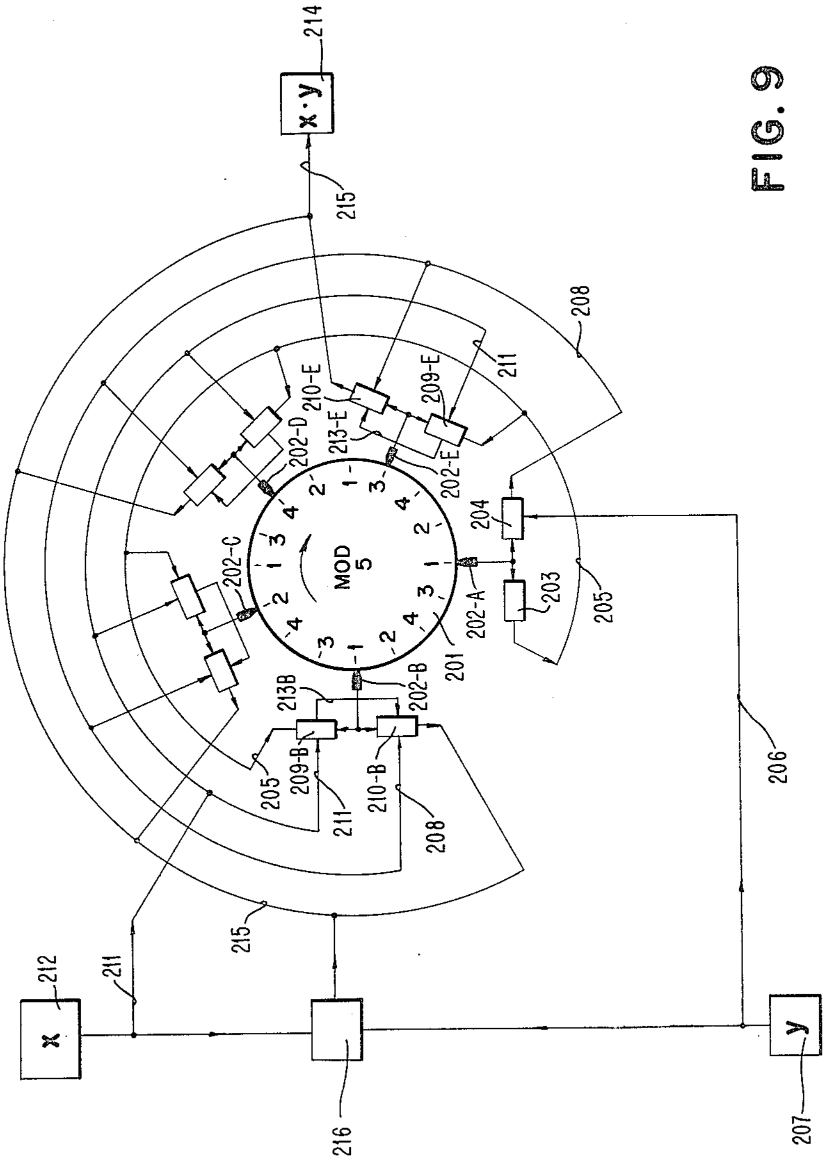

FIG. 9 is a diagram showing a further embodiment of the present invention comprising a rotatable permanent storage.

Figure 10A:
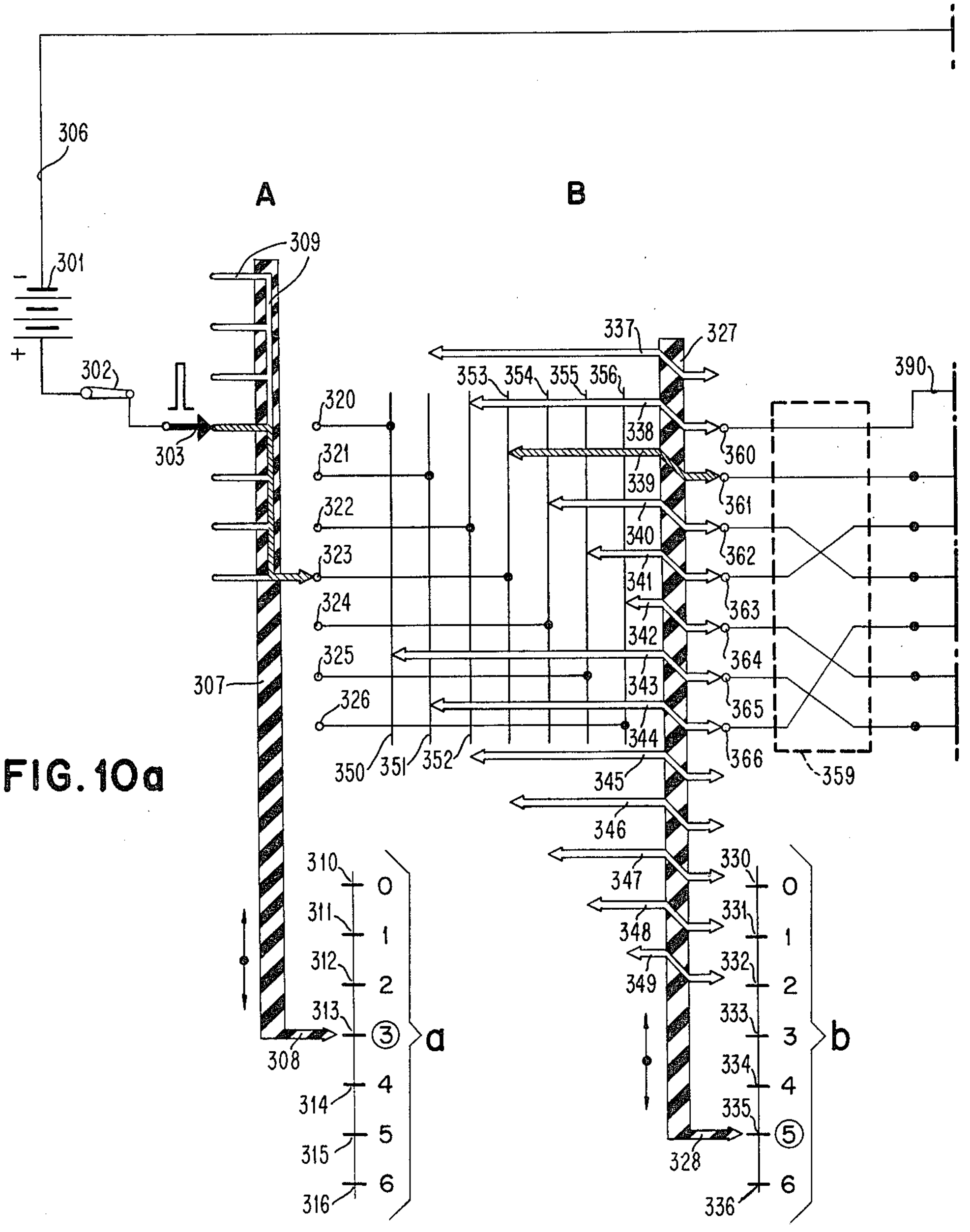
Figure 10:
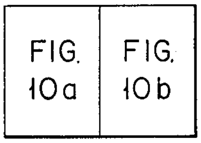
Figure 10B:
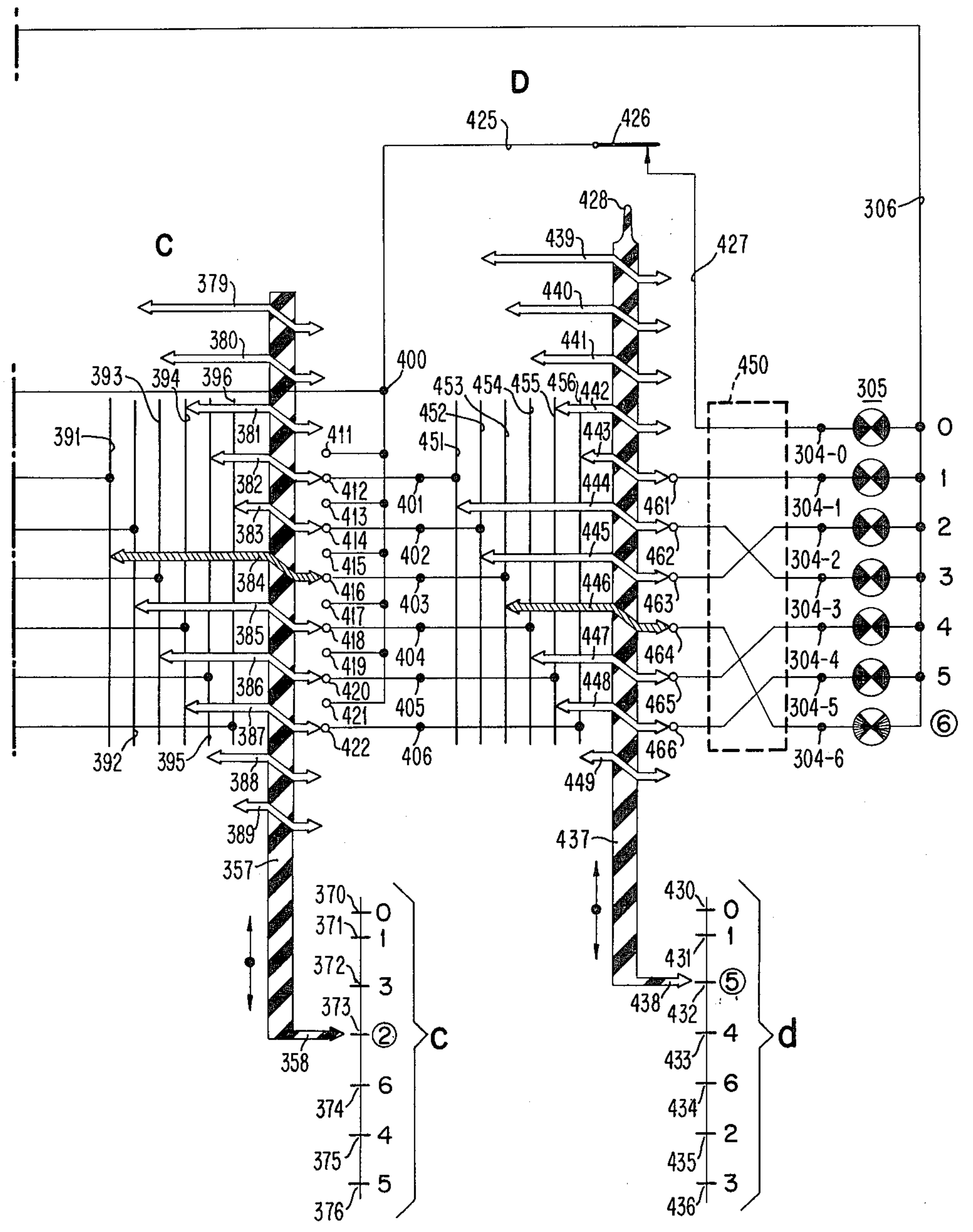

FIGS. 10*a* and 10*b* are diagrams depicting an arrangement of a multi-stage SRC arithmetic unit modulo 7 with parallel input means and an instantaneous result indication.

To illustrate the principle of SRC multiplication of two factors $x$ and $y$ modulo 7 according to the present invention, reference is made to FIG. 1*a* which depicts a block diagram of an SRC multiplying device modulo 7. The factor $x$ (mod 7) is represented by an actuating one input line out of the group of seven input lines 12. The factor $y$ (mod 7) is represented by actuating one input line out of the group of seven input lines 13. The dashlined rectangles 14 and 15 are conversion networks and merely contain input line cross connections. There exists an unequivocal interchange relation between the $x$-inputs "1"–12 through "6"–12 and the left hand group of adder input lines 16 which are connected to an adder 18, and between the $y$-inputs "1"–13 through "6"–13 and the right hand group of adder input lines 17 which are also connected to the adder. Said unequivocal conversion relation is based on the unequivocal coordination which exists between the residue numbers and the indices. The input line cross connections as shown in the rectangles 14 and 15 may be derived from a stored index table when going from the numbers in the line $p=7$ to the indices, thereby analogously connecting the $x$- and $y$-inputs which represent the values 1 through 6 with the adder input lines 16 and 17.

It should be noted that the adder 18 is a device operating modulo $(p-1)$, whereas the factors $x$ and $y$ are represented modulo $p$. The adder 18 determines the sum (mod 6) of two entities suitable for procession in said device by linear superposition, for instance. The sum (mod 6) produced by the adder 18 is represented by activation of one line out of the group of adder output lines 19. These output lines 19 are, in turn, interconnected with a group of output lines 21 representing the product $x \cdot y$ (mod 7) according to an interchange relation which can again be derived from the above index table. This interchange relation symbolically depicted by the dashlined rectangle 20 is obtained from the above index table when going from the indices to the residue numbers in the line $p=7$. The product of two numbers will always be zero if at least one of the factors equals zero for which a straight through connection through an "or" gate 24 for "0" is provided.

FIG. 1*b* depicts a block diagram of a computing unit for formal SRC division modulo 7 in an arrangement similar to FIG. 1*a*. In this block diagram there is provided an additional conversion network 27 which is adapted to establish the reciprocal translation $$\frac{1}{y}(\text{mod } 7)$$

If the divisor $y$ (mod 7) is represented by activation of one of the respective divisor input lines 16, its reciprocal $$\frac{1}{y}(\text{mod } 7)$$

will appear on the lines 13. The formal quotient $$\frac{x}{y}(\text{mod } 7)$$

will be represented by activation of one of the output lines 21.

The slide disk modulo 7 of FIG. 5*b* may be used for finding the cross connections of the conversion network 27. As will be shown later with reference to FIG. 5*b*, the reciprocals modulo 7 are placed symmetrically with respect to the vertical slide disk diameter which goes through "1" and "6." Thus, the line interconnections of the conversion network 27 for the establishment of the reciprocals can easily be derived from the slide disk of FIG. 5*b* by inspection. The related reciprocals modulo 7 are 1–1, 2–4, 3–5, 4–2, 5–3, 6–6. As already stated above, the product of related reciprocals is congruent to 1 (mod 7).

Networks 15 and 27 of FIG. 1*b* can obviously be combined into a single conversion network. This simplification is shown in FIG. 1*c* where network 29 achieves both the reciprocal transformation $$\frac{1}{y}$$

and the transformation of the reciprocals into their corresponding index notation. Therefore, network 29 produces the function $$''\text{ind}\,\frac{1}{y}''$$

The following supposition may be assumed with regard to the functioning of the adders 18 in the block diagrams of FIGS. 1*a*, 1*b* and 1*c*; this supposition is realized in the adder units of the workable embodiments to be described later. An output line 19 is actuated and thereby indicates a result only if both groups of adder input lines 16 and 17 have one line each actuated. None of the adder output lines 19 will be actuated if none or only one group of the adder input lines 16 or 17, respectively, has a line activated.

In designing SRC computing units for formal division as depicted in FIGS. 1*b* and 1*c*, the case that the divisor $y$ is congruent to zero (mod $p$) deserves special attention since the formal quotient $$\frac{x}{y}(\text{mod } p)$$

cannot be defined, irrespective whether there is a dividend $x \equiv 0$ or $x \not\equiv 0$ (mod $p$). In this case the appearance of any signal on the output lines 21 must be avoided in order not to lead to a delusive result for the formal quotient. This precaution is already met for $x \not\equiv 0$ (mod $p$) since, as stated above, the adder 18 only delivers an output signal on a line 19 if both groups of input lines 16 and 17 have one line each actuated. In order to avoid the appearance of an output signal on a line 21 in the event that the dividend $x$ is congruent to zero (mod $p$), a pulse which is applied to the left hand "0"-input (of the divident $x$) must be prevented from reaching the "0"-output of the formal quotient if the right hand "0"- input (of the divisor $y$) is simultaneously activated. This is done by an inhibitor 28, the inhibiting control input 30 of which is connected with the right hand "0"-input line out of the group of $y$-input lines 26.

The "or" gate 24, taken over from FIG. 1*a* into FIG. 1*b*, for illustrative purposes is redundant for formal SRC division and, therefore, has been left out in FIG. 1*c*.

FIG. 1*d* shows an arithmetic system employing several arithmetic units. As described above, the input data (operands) are described by several residues (e.g. 3, 5, 7, 11 and 13) and, to perform an arithmetic operation, the corresponding operand residues are applied to separate multipliers or divider units as shown in FIGS. 1*a*, 1*b* and 1*c*. As described with respect to FIGS. 1*a*, 1*b* and 1*c*, the input (operand) residues are converted to indices by input converters 14 and 15 (FIG. 1*d*). The indices are then linearly superimposed (added to perform residue multiplication or substracted to perform residue division) in devices 18 to provide result indices. These indices are converted to result residues by result converters 20. In this manner, several independently and simultaneously operating units of the type shown in FIGS. 1*a*, 1*b* and 1*c* are used in FIG. 1*d* to perform an arithmetic operation.

Having explained the basic principle of the subject invention by means of block diagrams, several workable embodiments will be described.

By arranging the number series of a line of the above index table in a spatial or temporal equidistant sequence, basically new devices for SRC multiplication and formal SRC division by index addition can be designed. The realization of the spatial (geometrical) equidistancy by mechanical means is found in the embodiments of FIGS. 2, 3, 5, 6 and 10. The realization of the temporal equidistancy by electrical or electronical means leads to the concept of the delay line circuits of FIGS. 4 and 7. A combination of both concepts, namely the spatial as well as the temporal equidistancy, is reflected in the embodiments of FIGS. 8*a*, 8*b* and 9 which comprise a rotatable permanent storage means.

In FIG. 2*a* the number series of the line $p=11$ of the above index table is associated with an equidistant scale. This scale is the basis for the construction of a SRC slide rule (mod 11) as illustrated in FIG. 2*b*. It should be noted that the number sequence used in FIGS. 2*a* and 2*b* is not the only possible number sequence which can be used for the construction of SRC slide rules. As it was already pointed out before, the number sequence of FIGS. 2*a* and 2*b* is based on the smallest primitive root $g=2$ belonging to the prime $p=11$. Other series of numbers based on other primitive roots may be used in the same way. Since the number of primitive roots modulo $p$ is equal to $N_p=\varphi(p-1)$, $\varphi$ being Euler's function, $N_p$ different SRC slide rules can be designed for a given prime $p$. For instance four different slide rules can be made for $p=11$ corresponding to the four primitive roots $g_1=2$, $g_2=6$, $g_3=7$, and $g_4=8$.

Their number sequence are:

| | | | | | | | | | | | |
|---|---|---|---|---|---|---|---|---|---|---|---|
| For $g_1=2$: | 1 | 2 | 4 | 8 | 5 | 10 | 9 | 7 | 3 | 6 | 1 etc. |
| For $g_2=6$: | 1 | 6 | 3 | 7 | 9 | 10 | 5 | 8 | 4 | 2 | 1 etc. |
| For $g_3=7$: | 1 | 7 | 5 | 2 | 3 | 10 | 4 | 6 | 9 | 8 | 1 etc. |
| For $g_4=8$: | 1 | 8 | 9 | 6 | 4 | 10 | 3 | 2 | 5 | 7 | 1 etc. |

It will be observed, that the number sequence for $g_2=6$ read from right to left constitutes the number sequence for $g_1=2$ and, therefore, is its reversal, and that the number sequence for $g_4=8$ is reverse to the number sequence for $g_3=7$. Because of the fact that the number sequences are cyclically repeating, it can be started with any number within these number sequences for a consecutive number series for the construction of an SRC slide rule.

FIG. 2*b* illustrates an SRC slide rule modulo 11. The device comprises two rules 31 and 32 in gliding relationship to each other, both rules carrying linear scales associated with the number sequence of FIG. 2*a*. In FIG. 2*b* the slide rule is shown in a position which corresponds to a multiplication by 5 (mod 11). The number "1" of rule 32 is positioned in alignment with number "5" of rule 31. The product (mod 11) resulting from a multiplication of 5 by any integer factor in the range between 1 and 10 can easily be found by inspection. For example, the result 7 of the product 5·8 (mod 11) is found on rule 31 because its "7" is in alignment with the factor "8" of rule 32. Other multiplications (mod 11) can be performed using this SRC slide rule in a manner similar to the use of an ordinary logarithmic slide rule.

Naturally, formal SRC division (mod 11) can be performed with the same slide rule. The slide rule position shown in FIG. 2b permits immediate reading of the formal quotient "5" as the result of the following formal SRC divisions modulo 11:

10:2, 9:4, 7:8, 3:5, 6:10, 1:9, 2:7, 4:3, 8:6, and 5:1

The slide rule of FIG. 2c differs from the slide rule of FIG. 2b only in that rule 33 carries the reversed number sequence of FIG. 2a, i.e. from right to left, whereas the number sequence of rule 31 remains unchanged. Thus, the scale of rule 33 can be considered as a reciprocal scale. By using a reciprocal scale, formal SRC division is performed as follows: The number "1" of rule 33 is positioned in alignment with the dividend on rule 31. The formal quotient (mod 11) is found on rule 31 where it is in alignment with the divisor on rule 33. The slide rule position shown in FIG. 2c permits immediate reading of the following congruences (mod 11):

$7\div 1\equiv 7$; $7\div 6\equiv 3$; $7\div 3\equiv 6$; $7\div 7\equiv 1$; $7\div 9\equiv 2$;
$7\div 10\equiv 4$; $7\div 5\equiv 8$; $7\div 8\equiv 5$; $7\div 4\equiv 10$; $7\div 2\equiv 9$.

In FIG. 3 there is shown a fluid-actuated SRC multiplying unit modulo 5 utilizing hydraulic principles known in the art. With reference to the left hand part of the device, a cylinder 44 is connected to a high pressure fluid through a lead 46. This connecting lead is branched in such a way that the fluid is delivered under equal pressure to both ends of the cylinder 44. A piston 45 is glideably arranged in said cylinder. Five output leads 43 are connected to the cylinder 44, each of said leads 43 being controlled by the respective one of five valves 41, which are normally closed.

For carrying out computational operations, one of said valves is opened in order to represent a factor which in the present example ranges from "0" to "4." In the rectangle 42 the leads 40 and 43 are cross-connected in such a manner that the factor is transferred from the number (residue) notation in to its corresponding index notation. The interchange 42 corresponds functionwise to the conversion network 14 of FIG. 1a.

In the left hand part of FIG. 3 the valve connected to the lead "4"–40 is opened and, therefore, a fluid (e.g. water or compressed air) supplied through the lead 46 is permitted to leave the exit lead "4"–40. The piston 45 will move to a position in which it tries to close that opening in the cylinder which leads to the exit lead "4"–40. Hereby, the piston 45 comes into a position of hydraulic equilibrium. Generally, this method of positioning a piston towards an exit lead is known in the hydraulics art under the term "port-searching." The term "port-searching servo" will be used for such a positioning device in the following description.

Similarly, there is also also provided a port-searching servo for the second factor; it is depicted in the right hand part of FIG. 3. Both port-searching servos resemble each other as to their construction as well as to their functioning. The designation numbers which refer to the right hand port-searching servo are marked with a prime. For example, the right piston is designated by 45', the left piston by 45.

The positioning of both pistons 45 and 45' is linearly superimposed. To accomplish this, the piston 45 is rigidly connected to a cylinder 48 by means of a rod 47, and piston 45' with an elongated piston member 50 slideably arranged in said cylinder 48 by means of a rod 49. The elongated piston member 50 carries six grooves 51 through 56. Its position relative said cylinder 48 is determined by the discrete positions of the pistons 45 and 45' in the two port-searching servos. The pistons are prevented from a rotation around their axis by a suitable slide guide (not explicitly shown in FIG. 3) to ascertain that the radial position of the grooves 51 through 56 always remains the same with respect to a fluid distributing channel 57 provided on the top of the cylinder as well as with respect to five outlets 60 through 64 located on the side of the cylinder.

Output leads 59 passing through a lead interchange box 65 are connected with the outlet 60 through 64. The interchange box 65 provides the retransfer of the resulting value from its index notation into the corresponding residue number notation and, therefore, said box 65 corresponds functionwise to the conversion network 20 of FIG. 1a.

The piston 50 is positionable into twelve discrete and definite positions within cylinder 48 by linearly superimposing the port-searching motion of the two pistons 45 and 45'. In each of these positions, one and only one of the grooves 51 through 56 is placed in alignment with one of the outlets 60 through 64 by the selected positioning of piston member 50 within said cylinder. Thus, a fluid entering an inlet 58 and being supplied therethrough to the distributing channel 57 is allowed to flow through the respective groove which serves as a through-passing channel, and streams out through one and only one of the output leads 59, thereby indicating the result of the performed arithmetic operation.

The special shape of the grooves 51 through 56 of piston member 50 is described below to establish the desired fluid connection between the distributing channel 57 and the outlets 60 through 64, to permit multiplication, including multiplication by zero.

Laterally on the front side of cylinder 48 there is shown an outlet 60 which is connected to an output lead "0"–59. Laterally on the rear side of cylinder 48 there are shown outlets 61 through 64 which are connected to output leads "1"–59 through "4"–59, respectively. The designation "front-" and "rear side" refers to the drafted arrangement depicted in FIG. 3.

Groove 51 is of such a form that it provides a fluid connection only between distributing channel 57 and outlets 61 through 64. A fluid connection between distributing channel 57 and outlet 60 is not possible through said groove 51. As shown in FIG. 3, this can be achieved by applying a partial groove on the rear portion of the piston member 50.

Grooves 52 through 55, however, are formed such that they provide a fluid connection only between distributing channel 57 and outlet 60. A connection between distributing channel 57 and outlets 61 through 64 is not possible by said grooves 52 through 55 but may be achieved, e.g. by four partial grooves of the same shape applied on the front portion of piston member 50, as shown in FIG. 3.

Groove 56 is of such a form that it permits the provision of a fluid connection between the distributing channel 57 and any of the outlets 60 through 64. This is achieved by a ring groove in piston member 50.

FIG. 3 shows the subject hydraulic SRC multiplier in a position which corresponds to the SRC multiplication $4\cdot 4\equiv 1$ (mod 5). Read-in of the two factors takes place by opening the two valves "4"–41 and "4"–41'. A fluid entering inlet 58 and being supplied therethrough to the distributing channel 57 will stream out through the output lead "1"–59, after having passed groove 51 provided in the rear portion of piston member 50 and serving as a fluid-passing channel, as well as outlet 61 provided laterally on the rear side of cylinder 48. Fluid-stream through output lead "1"–59 is indicative for the result 1 (mod 5) of the performed SRC multiplication.

Reference is now made to FIG. 4a which depicts an SRC arithmetic unit comprising delay lines, the structure of which unit remains unchanged for performing the basic SRC arithmetic operations, i.e. addition, subtraction, multiplication and formed division.

The use of electrical delay lines for performing arithmetic adding operations is known in the art. The basic concept of the electrical delay line addition is summarized as follows.

Electrical signals or pulses are controllably delayed in electrical delay lines by amounts of time proportional to the augend and addend, respectively. The total delay of the signal pulse corresponds to the sum of said terms, in other words, to the result of the addition to be performed. More specifically, by utilizing electrical delay lines for performing addition, an electrical signal is delayed a first time interval which is proportional to the augent; then the signal is further delayed by a second interval of time proportional to the addend. The total delay undergone by the signal is then measured in order to determine the value of the sum.

In the subject embodiment of the present invention, electrical delay line adders are adapted to perform higher degree SRC arithmetic operations. As will be exemplified in the following, by using the index calculus, SRC multiplication and formal SRC division can be performed by using delay line adders.

In FIG. 4*a* there is shown a first electrical delay line 61 having twenty equal delay sections between the taps 61–0 and 61–20. Each of the taps 61–0 through 61–10 connects a selectable part of said first delay line 61 to the input of a second electrical delay line 62 by means of a series of associated switches $B_x$ through $L_x$. The delay line 62 has taps 62–0 through 62–10 to provide ten sections of equal delay, equal to the delay in each of the sections of the first electrical delay line 61. Each of the taps of delay line 62 is connected to a common conductor 63 via a series of associated switches $B_y$ through $L_y$.

Each of the taps of delay line 61 connects to a first input of an associated "and" gate 64. The second inputs to said "and" gates are supplied in common from conductor 63. Outputs $B_z$ through $V_z$ of "and" gates 64–B through 64–V are arranged to indicate the result of the respective SRC arithmetic operation as will be explained more fully below.

Input 61–0 of delay line 61 is connected to a first input of an "or" gate 66 via switch $A_x$ and inhibitor 65, by means of a conductor 67. Input 62–0 of delay line 62 is connected to the second input of said "or" gate 66 via switch $A_y$, by means of a conductor 68. Output $A_z$ of "or" gate 66 is also arranged for result indication. The input 61–0 is further connected to the control input of inhibitor 65 via switch $O_y$, by means of a conductor 69.

Two numeric values to be calculated are entered into the apparatus by closing two correspondingly selected switches, the first one out of the group of x-switches designated $A_x$ through $L_x$, the second one out of the group of *y*-switches designated $O_y$, $A_y$ through $L_y$, respectively. Upon supplying a pulse to the input of delay line 61, it will travel through the whole delay line 61. The pulse will branch, however, at the tap of the closed *x*-switch, whereby a partial pulse enters delay line 62 in a parallel path and passes therethrough. At the tap which is associated with the closed *y*-switch, said partial pulse will branch once again, whereby a part of the pulse enters conductor 63 and finally is supplied in parallel to the second inputs of said "and" gates 64–B through 64–V. When said pulse approaches here, its total delay just corresponds to the sum of the single delay intervals to which it was subjected in each of the two delay lines 61 and 62. At the same time, the original part of the pulse which continued traveling through delay line 61 and which meanwhile has undergone the same delay as the abovementioned branched pulse, just reaches a tap which corresponds to said total delay. Thus, a coincidence of said two pulses is established on that "and" gate out of the group of "and" gates 64–B through 64–V which is connected to said tap, thereby delivering a signal on its output. This coincidence signal is an immediate indication of the result of the performed SRC calculation.

If switch $A_x$ instead of any one of the switches $B_x$ through $L_x$ is closed, the branched pulse will enter conductor 67 rather than delay line 62. By this, instead of having a coincidence of pulses at any one of the "and" gates 64, the output $A_z$ of "or" gate 66 will be pulsed unless an inhibit pulse is simultaneously supplied to the control input of inhibitor 65 by means of conductor 69. This occurs if switch $O_y$ is closed.

If switch $A_y$ instead of any one of the switches $O_y$, $B_y$ through $L_y$ is closed, the branched pulse will enter conductor 68 rather than conductor 63. Similarly as above, instead of having coincidence of pulses at any one of the "and" gates 64, the output $A_z$ of "or" gate 66 will be pulsed.

The embodiment of FIG. 4*a* can be used for all four basic SRC arithmetic operations (i.e. addition, subtraction, multiplication and formal division) modulo 11. FIG. 4*b* indicates which switches have to be closed when two numerical values *x* and *y* are to be subjected to one of the four basic arithmetic SRC operations modulo 11. The result *z* (mod 11) is indicated by a pulse at the respective output of the group of outputs $A_z$ through $V_z$. Switches and outputs designated by an asterisk (*) remain unused.

The table of FIG. 4*b* indicates which numerical values must be associated with the respective switches and outputs of the computing device of FIG. 4*a*, when performing said four basic SRC arithmetic operations. The lines of this table contain special number sequences which will be discussed in the following. Lines 1, 2 and 4, contain ordinary consecutive number sequences 0 through 10. Lines 3 and 6 contain consecutive number sequences 0 through 20 modulo 11. Line 5 contains a sequence of numbers representing the complements (mod 11) with respect to the numbers of line 4. Lines 7, 8 and 10 contain number sequences for $p=11$ of the index table. Lines 9 and 12 contain repeated number sequences for $p=11$ of the index table. Line 11 contains the reversed number sequence for $p=11$ of the index table, thus representing the reciprocals modulo 11 in respect to the numbers of line 10.

In the embodiment of FIG. 4*a* a special wiring is set forth for multiplication and formal SRC division in case that one or both factors are congruent zero. Said special wiring comprises the switches $A_x$, $A_y$, $O_y$, and the output $A_z$. Therefore, the respective places in the table of FIG. 4*b* corresponding to said switches and to said output are designated by zero.

The mode of operation of the delay type SRC arithmetic unit will be described with reference to FIG. 4*a* by a concrete example. Let it be assumed to multiply two numbers $x=9$ and $y=3$ (mod 11).

As it appears from lines 7 and 8 of the table of FIG. 4*b*, the multiplicand $x=9$ is entered by closing the switch $H_x$ the multiplier $y=3$ is entered by closing the switch $J_y$. A pulse is then supplied to the input terminal of delay line 61. This pulse travels through said delay line until it branches into a parallel path through the closed switch $H_x$. The partial pulse now travels through delay line 62 and branches again into a parallel path through the closed switch $J_y$. Hereafter it is simultaneously supplied to all inputs of the "and" gates 64 by conductor 63. Said partial pulse was subjected to a delay of six intervals in the first delay line 61 and, after branching, additionally eight delay intervals in the second delay line 62. Thus, at the instant when it reaches the parallel connected inputs of the "and" gates 64, its total delay is fourteen intervals. At this instant the other part of the pulse which continued traveling along the first delay line 61, has reached tap 61–64. Thus, a coincidence of said two pulses is established at "and" gate 64–P which is connected to said tap 61–14. A signal on the output $P_z$ of said "and" gate resulting from the established pulse coincidence, is indicative for the result of the performed SRC caluclation: $x=9$ multiplied by $y=3$ is congruent to 5 (mod 11). As it appears from line 9 of the table of FIG. 4*b*, a resulting signal on output $P_z$ of "and" gate 64–P represents the product 5 (mod 11).

On basis of the example discussed above, it is deemed to be obvious in which way the table of FIG. 4b must be used for proper correlation of the numeric values with the switches and outputs, respectively, for carrying out any of the four basic SRC arithmetic operations modulo 11 by means of the delay type embodiment of a SRC arithmetic unit depicted in FIG. 4a.

SRC slide disks may be considered as the circular counterpart of linear SRC slide rules (cf. FIG. 2b). For example, SRC slide disks modulo 11 and modulo 7 are depicted in FIGS. 5a and 5b, respectively. As to its basic construction, a SRC slide disk consists of two concentrically arranged disks 71 and 72 which are in a rotatable relationship to each other. Both disks carry congruent equidistant scales with number sequences taken from the index table. The slide disk (mod 11) depicted in FIG. 5a carries the number sequence valid for $p=11$, whereas the slide (mod 7) depicted in FIG. 5b carries the number sequence valid for $p=7$ of the index table. Two simple symmetry properties can immediately be seen by inspection. The sum of each two numbers located at the both ends of any of the diameters of a disk, equals $p$; that means that the numbers of each of said couple are complementary modulo $p$. The product of each two numbers placed symmetrically in respect to the diameter going through the numbers 1 and $(p-1)$ of a disk is congruent to 1 (mod $p$); that means that these numbers are reciprocals (mod $p$).

Circular SRC slide disks are used in similar manner to linear SRC slide rules. The operation of SRC slide rules has already been explained in some detail with reference to FIGS. 2b and 2c.

Reference is now made to FIGS. 6a, 6b and 6c in which there is shown a circular embodiment of a hydraulic SRC multiplying/dividing unit (mod 5). Broadly, it consists of a plurality of substantially identical circular port-searching servos 81 connected in cascade. The embodiment of FIG. 6a depicts three stages 81–A through 81–C.

Each port-searching servo comprises an outer part 82 and an inner part 83 which are in rotatable relationship to each other. The construction of the circular port-searching servos will be described in more detail with reference to FIG. 6b as follows.

Between the outer part 82 and the inner part 83, there is provided a fluid channel which is divided into a left hand portion 122 and a right hand portion 123, by the port-searching piston 125 rigidly connected to inner part 83. Both portions of the fluid channel are supplied with fluid from a high pressure lead 84 . The inlet 121 is branched by a branching element 124 in such a way, that fluid is delivered under equal pressure to both portions of the fluid channel.

Five outlets 126 through 130 are provided in the outer part 82 of the port-searching servo. The diameter of said outlets approximately equals the diameter of piston 125. Four outlets 126 through 129 are provided in equidistant spaces of 90° around the circumference of inner part 82. Outlet 121 is arranged by an angle of 45°, and outlet 130 is arranged by an angle $\beta$ with respect to outlet 126. In the port-searching servos 81–A and 81–B said angle $\beta$ equals 15°, as it is depicted in FIG. 6b.

Output leads 86 through 90 are connected to each of said five outlets 126 through 130. It will be understood, that the arrangement of FIG. 6a may comprise flexible leads—symbolically designated by $a, b, c, d, e$—is illustrative only for understanding the general principle. In a working model for practical reasons, said flexible leads should be replaced by a suitable design providing a stationary slot and channel labyrinth as it is known in the hydraulics art.

Valves 100 through 104 are provided in each of the output lines 86 through 90. Said valves are normally closed. If any one of said valves is opened so that the high pressure fluid in channel 84 is allowed to stream out via an outlet, e.g. 127, piston 125 according to the port-searching principle, will move into a position in which it tries to close said outlet (cf. FIG. 6b). By this way, a state of hydraudic equilibrium is established. The port-searching motion of inner part 83 is transmitted through its rigidly connected shaft 85 to the outer part of the port-searching servo of the next stage.

Entering of data into the single stages of the circular hydraulic SRC arithmetic unit depicted in FIG. 6a is accomplished in the same way as in the linear arrangement already disclosed with reference to FIG. 3, by opening of respective valves associated with the numeric values. Lead interchange boxes 91–A through 91–C, which functionwise correspond to networks 14 and 15 of FIG. 1a, are provided for establishing the transformation from SRC residue number notation into the corresponding index notation.

Mutual intercoupling of the port-switching servos of the single stages is accomplished by rigid shafts 85 which always connect the inner part 83 of a port-searching servo with the outer part 82 of the next port-searching servo, thereby transmitting the port-searching motion of piston 125 to the succeeding stage. The utmost right arranged port-searching servo (stage C) of FIG. 6a is connected to a result indicating stage 92 by means of the rigid shaft 85–C.

The embodiment of a circular hydraulic multiplying/dividing unit modulo 5 as it is depicted in FIG. 6a, is designed for culculating the function $2x \cdot 4y/3z$, whereby the constant factors 2, 4 and 3 have already been taken into account when determining the interchange of the leads in the interchange boxes 91–A through 91–C. Therefore, box 91–A establishes the transformation of the variable $x$ into the index of $2x$, box 91–B transforms $y$ into the index of $4y$, and box 91–C transforms $z$ into the index of $$\frac{1}{3z}$$

The index transformation is based on the primitive root $g=2$ of the prime modulus $p=5$.

The indicator stage 92 (FIG. 6c) comprises a stationary outer part 93, and in rotatable relationship to it, an inner part 94. The inner part is rigidly connected with shaft 85–C. The inner part 94 carries nine bores or grooves 95, 106 through 109, and 116 through 119, which are provided to serve as fluid channels to which fluid is supplied from a concentric high pressure channel 84. Outer part 93 comprises four outlets 111 through 114 arranged 90° apart, and a fifth outlet 115. Five output leads "0"–97 through "4"–97 are connected with each said outlets; in FIG. 6a, this connection is symbolically depicted by markings $a, b, c, d, e$. Fluid flow through one of the output leads 97 is indicative for the result of the performed calculation. The interchange box 98, function-wise corresponding to network 20 of FIG. 1a, establishes the reconversion of the result from the index notation into its corresponding SRC residue number notation.

In the indicator stage 92, the angular displacement between the channels 95 and 106, 106 and 116, 107 and 117, 108 and 118, as well as 109 and 119, equals the angle $\beta$ of the multiplying stages 81–A and 81–B; note that $\beta=15°$ in the disclosed embodiment. The channels 106 and 108, 116 and 118, 107 and 109, as well as 117 and 119 are placed opposite to each other.

In order to give an explanation for the reasons of the above chosen values for the angular displacement between the channels, let it be assumed that the multiplying stage 81–A and only this stage is positioned with its piston 125 towards outlet 130 which is associated with the numerical value "0." This means that shaft 85–C is subjected to an additional displacement of 15° which is added to the angular displacements coming from the remaining stages 81–B and 81–C. Under the above assumptions, said latter displacements can only be 0°, 90° or a multiple of 90°. An analogous case is present, if the port-searching piston of stage 81–B and only this stage is positioned towards outlet 130 which is associated with the factor "0." Here also, shaft 85–C, connected to indicator 92, is subjected to a deviation angle of 15° modulo 90°. In case that both stages 81–A and 81–B (but not 81–C) are positioned towards outlets 130 associated with the factors "0," a deviation $2\beta$ is superimposed at shaft 85–C, to the angular displacement derived from stage 81–C, which latter displacement can only be 0°, 90° or a multiple of 90°, under the above assumptions.

In each of the above mentioned three cases the result indication must be "0" in stage 92; therefore, fluid must be allowed to stream out through the opening 115 (and through no other one).

However, any result indication by fluid flow through either output lead "0"–97 or output leads "1"–97 through "4"–97, must be avoided if the divisor $z$ is congrunt 0 (mod 5), i.e. if the "0" valve 100–C is opened and, because of this, the port searching piston 125–C is aligned towards outlet 130–C. This requirement can be fulfilled by providing in the port-searching servo 81–C associated with the divisor, between the "0"-outlet 130–C and its adjacent outlet 126–C, an angle which is unequal to the corresponding angle in the multiplying stages 81–A and 81–B so that no one of the channels 95, 105 through 109, and 116 through 119 in the indicator 92, aligns with any of the five outlets 111 through 116, irrespective of the deviation established in the stages 81–A and 81–B. For example, this is achieved by making said angle between the outlets 130–C and 126–C in the formal SRC division stage 81–C, equal to 221/2°.

Following another design philosophy, it appears to be obvious to use a hydraulic inhibitor valve for result suppression, in case that the divisor $z$ is congruent 0 (modulo 5), operating in accordance with the principle already outlined with reference to FIGS. 1*b* and 1*c*.

There follows now a description of the operational behavior of the disclosed hydraulic SRC arithmetic unit when calculating the function $2x \cdot 4y/3z$ (mod 5) with the numeric $x=2$, $y=2$ and $z=1$. Read-in of said values into the unit is performed by actuating (opening) the respective valves 102–A, 102–B and 101–C which are related to the chosen values. By this way, in all 3 stages the fluid supplied through the high-pressure lead 84 is permitted to stream out through the respective output leads 88–A, 89–B and 87–C associated with the open valves. In each of these three stages A, B and C the port-searching pistons come into such alignment that they try to close the respective outlets leading to the output leads 88–A, 98–B and 87–C. Since the outer part 82–A of the utmost left port-searching servo is stationary, the entire device comes into a definite hydraulic state of equilibrium as it is depicted in FIG. 6*a*. The angular deviation in each of the port-searching servos superimpose; the overall angular deviation is transmitted from the last port-searching stage 81–C to the indicator stage 92 via the rigid shaft 85–C. Since the outer part 93 of the indicator is stationary, there is obtained a defined positioning of the rotatable part 94 rigidly connected with said shaft 85–C. Because of the resulting angular motion, the through-passing channel 95 provided in part 94 aligns towards the outlet 113, so that the fluid supplied through the high pressure lead 84 is allowed to stream out through output lead "4"–97. In this way, the result "4" of the performed calculation is indicated. Thus, the function $2x \cdot 4y/3z$ calculated with the numeric values $x=2$, $y=2$ and $z=1$ is congruent to 4 (mod 5).

Reference is now made to FIG. 7 which depicts an SRC multiplying unit modulo 7 comprising electrical delay lines in a circular arrangement. The circular delay line multiplying unit corresponds functionwise to the SRC arithmetic unit of FIG. 4*a* which depicts a linear arrangement of the delay line. In FIG. 7 there is provided a first electrical delay line 151 in a closed circular arrangement having six equally delaying sections between the taps 151–0 through 151–5. Each of these taps is connected to the respective one of six switches 151–10 through 151–15; the latter are commonly connected to the input of a second linear electrical delay line 152 comprising five equally delaying sections. The single sections of delay line 152 have characteristics equal to the characteristics of the single sections of the delay line 151. Each of the six taps 152–0 through 152–5 of delay line 152 are connected to six switches 152–10 through 152–15 which in turn are commonly connected to the first inputs of six "and" gates 154–10 through 154–15, by means of a conductor 153. Each of the second inputs of said "and" gates are connected to a tap of the delay line 151 as shown in FIG. 7.

If both inputs of an "and" gate say 154–11, are pulsed, a coincidence signal will appear at the respective output 154–1 of said "and" gate, which signal is indicative of the result of a performed SRC multiplication, as will become clear from the description below.

The input terminal 151–0 of the circular delay line 151 is further connected to a switch 151–16 which in turn is connected with a first input of an "or" gate 156, by conductor 157. The input 152–0 of the second delay line 152 is further connected with a switch 151–16 which in turn is connected with the second input of said "or" gate 156, by conductor 158.

If one or both inputs of said "or" gate are pulsed, a signal will appear at the associated output 156–6, thereby indicating the result "0" of a performed SRC multiplication.

The two factors $x$ and $y$ to be multiplied are entered into the apparatus by closing two correspondingly selected switches, the first switch out of the group of $x$-switches 151–10 through 151–16, and the second out of the group of $y$-switches 152–10 through 152–16. Each of said switches is related to a specific numerical value for the factors $x$ and $y$, and each output associated with the "and" and "or" gates 154 and 156, respectively, is related to a specific numeric value for the result of the performed SRC multiplication modulo 7. The coordination valid for our embodiment, is given below in three designation tables. It holds for the numbers of the factor $x$:

| x | 1 | 3 | 2 | 6 | 4 | 5 | 0 |
|---|---|---|---|---|---|---|---|
| x-switch | 151–10 | 151–11 | 151–12 | 151–13 | 151–14 | 151–15 | 151–16 |

for the numbers of the factor $y$:

| y | 1 | 3 | 2 | 6 | 4 | 5 | 0 |
|---|---|---|---|---|---|---|---|
| y-switch | 152–10 | 152–11 | 152–12 | 152–13 | 152–14 | 152–15 | 151–16 |

for the numbers of product $x \cdot y \equiv z$ (mod 7):

| z | 1 | 3 | 2 | 6 | 4 | 5 | 0 |
|---|---|---|---|---|---|---|---|
| Output line. | 154–0 | 154–1 | 154–2 | 154–3 | 154–4 | 154–5 | 156–6 |

Note, that the number sequences valid for $x$, $y$ and $z$ (however, disregarding "0") correspond to the number sequence of line $p=7$ of the index table. The association of "0" with the switches 151–16 and 152–16 and with the output 156–6 is made according to the special wiring which is provided for multiplication by zero.

After closure of the respective switches associated with the two factors $x$ and $y$, a pulse is supplied to the input conductor 159 which is connected to tap 151–0 of circular delay line 151. In order to assure that said pulse circulate through delay line 151 in a predetermined direction, a diode 155 is provided which allows pulse circulation in counter-clockwise direction only. Said pulse will branch at the respective closed $x$-switch. Thereby, one part enters delay line 152 and passes therethrough. Said pulse will branch once again at the respective closed y-switch. Thereby, a part of it is supplied in common to the parallel connected first inputs of the "and" gates 154, by conductor 153. At the instant, when the partial pulse reaches here, the other part of the input pulse circulating in delay line 151 in a counter-clockwise direction, reaches a tap which is indicative of its total delay (mod 6). Thus, a coincidence of the two partial pulses is established at the respective "and" gate connected to the tap. This pulse coincidence is indicated by the appearance of a signal at the output of said "and" gate.

If the x-switch 151–16 associated with the factor $x=0$ is closed, the branched pulse will never enter delay line 152 but will be supplied to the first input of "or" gate 156, by conductor 157. In this case, there will appear a signal on the output 156–6 of said "or" gate. This signal is indicative for the result 0 (mod 7) of a performed SRC multiplication in which the factor x is "0."

If the y-switch 152–16 associated with the factor $y=0$ is closed, the branched pulse is supplied to the second input of "or" gate 156, by conductor 158. Also in this case, a signal will appear on the output 156–6 of said "or" gate. Similarly as above, this signal is indicative for the result 0 (mod 7) of a SRC multiplication with the factor $y=0$.

As an example, let it be assumed that two factors $x=4$ and $y=6$ are multiplied modulo 7. According to the above designation tables, the multiplicand $x=4$ is entered by closing the x-switch 151–14, the multiplier $y=6$ by closing the y-switch 152–13. An input pulse is then supplied to conductor 159. This pulse enters delay line 151 and circulates through it in counter-clockwise direction. The pulse branches at the closed x-switch 151–14. The branched pulse enters the second delay line 152 where it branches once more at the closed y-switch 152–13, and is supplied to the commonly parallel connected inputs of the "and" gates 154, by conductor 153. Said pulse was delayed four intervals in delay line 151 and, after branching additionally three intervals in delay line 152. Therefore, its total delay is seven intervals at the time when it reaches the inputs of the "and" gates 154. At this instant, the circulating part of the pulse running through delay line 151 has reached tap 151–1, after one full through-passage of said delay line. Thus, a coincidence of the two-partial pulses is established at the respective "and" gate 154–11 connected to said tap, thereby delivering a coincidence signal on its associated output 154–1. Said signal on output 154–1 characterizes the resulting numeric value $z=3$ of the performed multiplication $4 \cdot 6 \equiv 3 \pmod{5}$, as can be determined from the above designation table.

Reference is now made to FIG. 8a in which there is disclosed an embodiment of an SRC multiplying unit modulo 11, based on the index calculus, comprising a rotatable permanent store, e.g. a magnetic drum or a magnetic disk. It should be noted here, that it is also possible to design an SRC arithmetic unit based on the principle of the embodiment of FIG. 8a comprising any other suitable permanent storage means e.g. a device with electrostatic charges or a device with permanent coded markings which may be scanned by optical means.

In the embodiment of FIG. 8a there is provided a circular track 180 of a rotatable magnetic drum or magnetic disk. This track carries a magnetic pattern which constitutes a coded representation of a sequence of numbers, the single numbers being equally spaced around said track. The code used for representing these numbers can be any code known in the art. In FIG. 8a the used number sequence 1–2–4–8–5–10–9–7–3–6 is written along the circumference of the track 180 in clockwise direction and corresponds to the line $p=11$ of the index table. There are provided two reading heads 181 and 182 which cooperate with said drum track 180. The two factors x and y to be multiplied are temporarily stored in two registers 183 and 184, in suitable coded form, for example, as a binary static voltage pattern.

Register 183 is connected to a first input, and reading head 181 is connected to a second input, of a coincidence circuit 185. In case the reading head 181 reads a number which is identical with the number stored in register 183, a coincidence signal will appear at the output of said coincidence circuit 185, which signal is supplied to the parallel connected first inputs of ten decoding "and" gates 187, by conductor 186. The second inputs of said decoding "and" gates 187 are connected in parallel to register 184, by conductor 188.

Each of the ten gates 187 is able to perform a twofold function. First, the binary voltage pattern representative of the factor y supplied to the second input from register 184 by conductor 188, is decoded by means of a suitable decoding circuitry. In FIG. 8a, the respective decoding characteristics of the gates 187 are designated by numbers written into the respective rectangles. Secondly, the gates 187 are assumed to perform an "and" function as follows: if a pulse is supplied to the first input of a gate 187 by conductor 186 and if, simultaneously, the decoding condition of said gate if fulfilled, that means that the number temporarily stored in register 184 is identical to the number of the decoding characteristic, a signal or a pulse occurs at the output of the respective decoding "and" gate, which pulse is supplied to a delay line 190, by conductor 189.

The ten outputs of said decoding "and" gates 187 are connected to respective taps 190–A through 190–J of a delay line 190, by conductors 189–A through 189–J. The delay line 190 is divided into nine equally delaying sections by said taps. The time of delay of each section equals one tenth of the revolution time of the magnetic drum track 180.

The lowest tap 190–J of said delay line is connected to the control input of a gate 192, by a conductor 191. If a pulse is supplied to said control input, the gate will be opened and a number read by head 182 from the drum track, will be taken over into the product register 194, via conductor 193.

Considering the group of decoding "and" gates 187, it will be noted that the numbers inscribed therein from top to bottom which symbolically stand for its decoding characteristic, correspond to the numbers of the magnetic drum track 180 taken in a clockwise direction. Thus, the number written into the rectangles form a number sequence which is again based on the index calculus.

The operation of the SRC multiplying unit modulo 11 as depicted in FIG. 8a will now be explained by means of an example. Let it be assumed that the factors $x=3$ and $y=6$ are to be multiplied modulo 11. The multiplicand $x=3$ is temporarily stored in register 183, whereas the multiplier $y=6$ is in register 184. When drum track 180 has reached a position that reading head 181 reads the number "3" (as shown in FIG. 8a) corresponding to the multiplicand, coincidence is established in the "and" gate 185. This coincidence causes the generation of a pulse which is supplied to all the first inputs of the decoding "and" gates 187, via conductor 186. The static binary voltage pattern of the multiplier $y=6$ stored in register 184, is present on all the second inputs 188 of the decoding "and" gates 187. Since only gate 187–D exhibits a decoding characteristic "6," the necessary condition of an "and" relation is fulfilled only for this gate with the pulse supplied through the first input via conductor 186, meaning that only the output of gate 187–D will be pulsed. This pulse delivered by conductor 189–D enters the delay line 190 at tap 190–D and travels therethrough toward tap 190–J and is finally supplied to the control input of gate 192, via conductor 191. In the delay line, said pulse has been delayed a time which equals six tenths of a full drum revolution. At the instant when the pulse enters said control input, the magnetic drum track has advanced to a position at which the pattern "7" passes reading head 182. Since the pulse on conductor 191 opens the gate 192, the pattern "7" read by magnetic head 182 is delivered to the product register 194, via conductor 193. The number "7" is the result of the performed SRC multiplication $3 \cdot 6 \equiv 7 \pmod{11}$.

Reference is now made to FIG. 8*b* which depicts a further embodiment of a SRC multiplying unit modulo 11 comprising a magnetic storage means. It differs from the embodiment disclosed in FIG. 8*a* in that an additional track on a magnetic drum or a magnetic disk is used, instead of a delay line. In FIG. 8*b* there is provided a first magnetic drum track 280 and a second magnetic drum track 279 which as indicated may rotate in clockwise direction. Track 280 carries a permanent magnetic pattern which constitutes a coded representation of a sequence of numbers, which numbers are equally spaced around said track. The code used for representing these numbers can be any code known in the art. In FIG. 8*b* the used number sequence 1–2–4–8–5–10–9–7–3–6 which is in correspondence with line $p=11$ of the index table, is distributed across the circumference of track 280 in a clockwise direction. There are provided two magnetic reading heads 281 and 282 which cooperate with said drum track 280. The factors $x$ and $y$ to be multiplied are temporarily stored in suitable registers 283 and 284, respectively, in similar way as in the embodiment of FIG. 8*a*. Register 283 is connected to a first input, and reading head 281 is connected to a second input, of a coincidence circuit 285. If two identical numbers are fed to said two inputs of the coincidence circuit 285, a coincidence impulse will appear at the output of said circuit, which is delivered to a writing head 295, via conductor 286. Said pulse will be recorded onto the magnetic drum track 279, e.g. in form of a magnetic spot, by means of writing head 295. In cooperation with drum track 279 there are provided ten magnetic reading heads 290–A through 290–J equally spaced around its circumference, and an erasing head 296. The distance between two adjacent reading heads 290 equals the distance between two adjacent number patterns of track 280. In the disclosed embodiment, writing head 295 is positioned half the distance with respect to its adjacent reading heads 290–A and 290–J, respectively. Erasing head 296 is positioned in close proximity at the left hand side of writing head 295. A pulse which is recorded on drum track 279 by means of head 295, will pass the reading heads 290–A through 290–J in consecutive order. Each of said ten reading heads 290 is connected to a first input of an associated decoding "and" gate 287, by means of conductors 289–A through 289–J, respectively. The second inputs of said "and" gates 287 are connected in parallel to register 284, by means of conductor 288. The functioning of said decoding "and" gates is the same as in the embodiment of FIG. 8*a*. As was already shown in FIG. 8*a*, the numbers representing the decoding characteristics of said gates are written into the corresponding rectangles, also in FIG. 8*b*. The outputs of the gates 287 are parallel-connected to the control input of a gate 292, by means of a conductor 291. This gate is opened if its associated control input is pulsed, whereby the number pattern read by reading head 282 is delivered to the product register 294, via conductor 293. The angular distance $\varphi$ between reading head 281 and reading head 282 is determined by $$\varphi=\delta+\frac{2\pi}{p-1}\cdot g_{\text{ind } z}$$

$\delta$ being the angular distance between writing head 295 and reading head 290–A; $z$ being the number representing the decoding characteristic of gate 287–A, with $$1 \leq z \leq (p-1)$$

$p=11$ and $g=2$ for the subject embodiment.

The numbers inscribed from top to bottom into the rectangles 287, which numbers symbolically stand for the decoding characteristics of the "and" gates, correspond to the numbers of the magnetic track 280 when taken in a counter-clockwise direction. Thus, said number sequence is again related to the index calculus and may be derived therefrom.

The operation of the SRC multiplying unit modulo 11 as depicted in FIG. 8*b* will now be explained by means of an example: multiplication of the factors $x=6$ and $y=3$ modulo 11. The multiplicand $x=6$ is temporarily stored in the register 283, whereas the multiplier $y=3$ is in register 284. When the magnetic drum track 280 has reached such a position that reading head 281 reads "6" (as shown in FIG. 8*b*) corresponding to the multiplicand, coincidence is established by the "and" gate 285. A pulse generated upon said coincidence is delivered through conductor 286 to the writing head 295 and recorded on the drum track 279, e.g. in form of a magnetic spot. Said magnetically inscribed pulse is then read sequentially by the magnetic heads 290–A through 290–J and will be erased by erasing head 296 after approximately one drum revolution. By this way, the read pulses are, in succeeding order (as determined by the drum revolution), delivered to the first inputs of the decoding "and" gates 287, by means of conductors 289 connected to the respective reading heads 290–A through 290–J. The static binary voltage pattern of the multiplier $y=3$ stored in register 284 is present on all the second inputs 288 of the decoding "and" gates 287. Since only gate 287–H represents a decoding characteristic "3," the necessary condition of an "and" relation is fulfilled only on said gate, in cooperation with the pulse read from magnetic drum track 279 and delivered by conductor 289–H; meaning that only the output of gate 287–H will be pulsed. Said pulse is supplied to the control input gate 292 via conductor 291. At the instant when the pulse enters there, its delay corresponds to ¾ of one drum revolution, starting with the time of registration of the coincidence pulse onto drum track 279 by means of writing head 295. Since it is assumed that the rate of revolution of both magnetic drum tracks 279 and 280 are the same, drum track 280 has in the meantime advanced the same amount. The magnetic drum track 280 is then in a position in which the magnetic head 282 reads the pattern "7." Since the pulse on conductor 291 opens gate 292, the pattern "7" read by reading head 282, is allowed to pass to the product register 294 via conductor 293. The number "7" is the result of the performed SRC multiplication $6 \cdot 3 \equiv 7 \pmod{11}$.

FIG. 9 depicts a further embodiment of a SRC multiplying unit modulo 5 comprising a rotatable magnetic permanent storage means. There are provided several magnetic reading heads cooperating with a magnetic drum track 201. The magnetic drum track carries, in a cyclically-repeating succession, a permanent number sequence suitably coded by magnetic spots, the single number patterns being equally spaced along the circumference of said track. The code used for number representation may be any code known in the art. The used number sequence 1–2–4–3 corresponding to line $p=5$ of the index table, is provided four times in counter-clockwise direction across the circumference of the magnetic drum track 201.

Four magnetic heads 202–B through 202–E are arranged in such a manner that by cooperating with magnetic drum track 201, each magnetic head reads a different number pattern. A fifth magnetic head 202–A is used for timing purposes; this head can be combined with any one of the other four magnetic heads; this combination, however, was avoided in FIG. 9 for the purpose of a more simplified explanation.

The magnetic head 202–A is connected with a "1"-decoding circuit 203 and with a first input of a coincidence circuit 204. The decoding circuit 203 is so designed that its associated output line is pulsed in case that the magnetic head 202–A reads pattern "1." The second input of coincidence circuit 204 is connected to register 207 via conductor 206. The multiplier $y$ is temporarily stored in said register. If magnetic head 202–A reads a number pattern which is identical with the number stored in the multiplier register 207, a coincidence is established in circuit 204. This coincidence causes the appearance of a pulse on conductor 208.

Since the circuit arrangement associated with each of the magnetic reading heads 202–B through 202–E is the same, its mode of operation will be described only once with reference to head 202–E. However, the following description also applies in the same way for the circuitry associated with reading heads 202–B, 202–C and 202–D, when substituting marking E by respective markings B, C, D.

The magnetic head 202–E is connected to a first input of a coincidence circuit 209–E and to the input of a gate 210–E. A second input of coincidence circuit 209–E is connected to the output of the decoding circuit 203 via conductor 205, and a third input is connected via conductor 211 to register 212 wherein the multiplicand $x$ is temporarily stored. If a number pattern is read corresponding to the multiplicand $x$, by reading head 202–E and if simultaneously an impulse is supplied via conductor 205, the coincidence condition for circuit 209–E is fulfilled. This coincidence causes pulsing of conductor 213–E which is connected to a first control input of a gate 210–E. A pulse supplied to said control input makes gate 210–E conditioned and holds it conditioned during at least a quarter of a drum revolution. If during this conditioned period a second pulse is supplied to a second control input of gate 210–E via conductor 208, said gate will be opened and the number pattern read by magnetic head 202–E is allowed to pass through to product register 214, via conductor 215.

There is provided a "0"-decoding circuit 216 for multiplication by zero. It is designed so that, in case a zero is temporarily stored in either one or both of the two register 212 or/and 207, the respective binary voltage pattern representing "0" will immediately pass through said decoding circuit, thereby being delivered to and taken over from the product register 214, via conductor 215.

This special wiring provided for multiplication by zero as it is depicted in the embodiment of FIG. 9 can obviously be applied in exactly the same way to the devices of FIGS. 8*a* and 8*b*; however, this circuitry for multiplication by zero is not explicitly shown there in order not to complicate the figures.

The mode of operation of the SRC multiplying unit modulo 5 shown in FIG. 9 is now described with reference to an example. Let it be assumed that the two numbers $x=3$ and $y=4$ are to be multiplied modulo 5. The multiplicand $x=3$ is temporarily stored in register 212, whereas the multiplier $y=4$ is in register 207. If the number pattern "1" is read by magnetic head 202–A (this position is depicted in FIG. 9), the decoding circuit 203 becomes operative and—as already stated above—delivers a pulse to conductor 205; said pulse is supplied to all parallel connected coincidence circuits 209–B through 209–E and establishes coincidence in the circuit 209–E because at this instant its associated reading head 202–E reads a number pattern from magnetic track 201 which corresponds to the multiplicand $x=3$ stored in register 212. Coincidence in circuit 209–E causes the generation of a pulse which is delivered to the first control input of gate 210–E via conductor 213–E. Said gate becomes conditioned by said pulse and is held operative during at least a quarter of a drum revolution. During its conditioned state, more specifically, an eighth drum revolution after the gate 210–E became conditioned, the magnetic head 202–A reads a number pattern corresponding to the multiplier $y=4$, from drum track 201. Coincidence is now established in circuit 204, viz. code pattern "4" read by magnetic head 202–A and voltage pattern "4" delivered from register 207 via conductor 206. This coincidence causes the generation of a pulse which is supplied to the parallel connected second control inputs of the gates 210–B through 210–E, via conductor 208. Since, as outlined above, only gate 210–E is held operative in a conditioned state, said pulse can only be effective with respect to said gate with the result that it is opened. At this instant its associated magnetic head 202–E reads number pattern "2" which is allowed to pass through said gate and delivered to the product register 214 via conductor 215; "2" is the result of the performed SRC multiplication $3\cdot4\equiv2 \pmod 5$.

Reference is now made to FIG. 10 which depicts a multi-stage SRC arithmetic unit for calculating the function $(a+b)\cdot c/d \pmod 7$ wherein the independent variables $a$, $b$, $c$ and $d$ are integers ranging from 0 to 6. Characteristic features of the subject embodiment are the parallel input of the variables into the single stages and the instantaneous result indication. There is provided a battery or other suitable current generator 301, the first (e.g., positive) terminal of which is connected to the input of current supply 303 of the SRC arithmetic unit via switch 302. Said SRC arithmetic unit comprises four cascaded stages generally designated A, B, C, and D connected and operating in a pyramid-like fashion. Each stage is visualized for the read-in of one variable. The mode of operation of the four cascaded stages is such that current flow is established in one of the seven output conductors designated by 304–0 through 404–6 (in case of $d\neq0$). Each of said outputs is connected to a suitable utilization device: e.g. a group of lamps 305–0 through 305–6; one of them is illuminated to indicate the result of the performed calculation.

The stage A which is used for the read-in of the variable $a$ comprises an insulated glideable stick 307 which can be positioned into seven different positions marked 310 through 316. The actual positioning of said stick is indicated by an arrow 308 situated on its lower portion. The stick 307 carries a conductive portion 309 which, depending upon the positioning of the stick, connects input terminal 303 to the respective one out of the group of terminals 320 through 326.

The stage B into which the variable $b$ is read-in comprises an insulated glideable stick 327 which can again be positioned into seven different positions marked 330 through 336. The actual positioning is indicated by an arrow 328 on the lower part of stick 327. Said stick carries thirteen brushes 337 through 349 insulated from each other. These brushes are provided to establish suitable current paths from terminals 320 through 326 of stage A to terminals 360 through 366 of stage B. Each of the terminals 320 through 326 is connected to an associated slip-bar out of the group of slip-bars 350 through 356; the brushes 337 through 349 are glideably arranged along said slip-bars. More specifically: terminal 320 of stage A is connected to slip-bar 350 on which brush 343 is gliding; terminal 321 to slip-bar 351 with gliding brushes 337 and 344; terminal 322 to slip-bar 352 with gliding brushes 338 and 345; terminal 323 to slip-bar 353 with gliding brushes 339 and 346; terminal 324 to slip-bar 354 with gliding brushes 340 and 347; terminal 325 to slip-bar 355 with gliding brushes 341 and 348; and terminal 326 of stage A is connected to slip-bar 356 on which brushes 342 and 349 are gliding.

The next stage C resembles B as to its arrangement and construction. Whereas B is an SRC adding stage, C is used for SRC multiplication. According to the concept of the present invention, means are provided for transforming the respective factors supplied to the multiplying stage C into their index notations. This is performed for the one factor by interchanging the respective conductors in a conversion network 359 functionwise corresponding to network 14 of FIG. 1*a*, and for the second factor by a suitable coordination of the numeric values 1 through 6 of the variable C with the positioning markings 371 through 376 of glide stick 357 of stage C, as will be explained in more detail below.

Stage C into which variable $c$ enters, comprises an insulated glideable stick 357 which can be positioned into seven different positions marked 370 through 376. Positioning is indicated by an arrow 358 on the lower part of stick 357. Said stick carries eleven brushes 379 through 389 which are insulated from each other and are in glideable cooperation with six slip-bars 391 through 396. These six slip-bars are connected to the terminals 361 through 366 of stage B via an conversion network 359. The interconnection between terminals 361 through 366, slip-bars 391 through 396 and glideable brushes 379 through 389 is similar to stage B and precisely depicted in the drawing of FIG. 10.

There is provided a special wiring for the factor "0" appearing at the output of stage B, comprising a conductor 390 which directly connects terminal 360 with terminal 400 of stage C.

The brushes 379 through 389 cooperate with a series of contacts 411 through 422 in order to establish proper current paths between terminals 361 through 366 of stage B and terminals 400 through 406 of stage C. Contact 412 is connected with terminal 401, contact 414 with terminal 402, etc.

In order to account for a factor $c=0$ entered into stage C by positioning glide stick 357 into the half step position 370, a special wiring is utilized comprising the contacts 411, 413, 415, 417, 419 and 421 which are commonly connected to terminal 400 of stage C. The seven terminals 400 through 406 represent the output of stage C.

The next stage D resembles stage C as to its arrangement and construction. Whereas C is a SRC multiplying stage D is provided for formal SRC division. The difference in the arithmetical functioning between stages C and D is solely determined by mutual reversal of associating the numeric values with the positioning markings 431 through 436 of glide stick 437 of stage D with respect to the positioning markings 371 through 376 of glide stick 357 of stage C. It will be noted that the product of two numbers which in the stages C and D are associated with the respective positioning markings 371/431, 372/432, 373/433, 374/434, 375/435, 376/436, is congruent 1 (mod 5). Since the product $(a+b)\cdot c$ (mod 7) is already represented in its index notation at the terminals 400 through 406, the output lines of stage C can be directly through-connected to the input lines of stage D without any line interchangement.

Stage D into which the variable $d$ is read-in, comprises an insulated glideable stick 437 which can be positioned into seven different positions 430 through 436. Actual positioning is indicated by an arrow 438 on the lower part of stick 437. Said glideable stick carries eleven brushes 439 through 449 which are insulated from each other and which are glideably arranged with respect to six glide-bars 451 through 456. Six brushes each of said group of eleven collector brushes provide suitable current paths from terminals 401 through 406 of stage C to terminals 304–1 through 304–6 of stage D, via said glide-bars 451 through 456, a series of contacts 461 through 466 and conversion network 450 for converting from the index notation into the SRC number notation of the result and, therefore, functionwise corresponding to network 20 of FIG. 1$a$. Terminal 400 is connected with terminal 304–0 via conductor 425, switch 426 and conductor 427. The switch 426 cooperates with glide-stick 437 in such a way that it is opened if stick 437 is positioned in alignment with the positioning marking 430 (i.e. zero-position), whereas it is closed if stick 437 is positioned in alignment with any of the other positioning markings 431 through 436. Opening of switch 426 can be achieved, for example, by means of an insulated top portion 428 of stick 437, as it is depicted in FIG. 10. By this way, switch 426 serves as an inhibitor in that it avoids the appearance of any output signal in case that the operation 0:0 (mod 7) would be tried in stage D. Additionally, the zero-position 430 is chosen such that no connection of the brushes 439 through 449 is established with any of the contacts 461 through 466. This special provision is necessary since formal SRC division by zero modulo $p$ does not lead to any definite result as it was already pointed out before with reference to FIG. 1$b$.

As mentioned above, four glide-sticks 307, 327, 357 and 437 are visualized for the read-in of the variables $a$, $b$, $c$, $d$ into the respective stages A, B, C, D, each stick being positionable into seven possible positions designated by 310 through 316 (stage A), 330 through 336 (stage B), 370 through 376 (stage C), and 430 through 436 (stage D). The number values 0 through 6 are associated with said positions in a distinct manner. They are associated with the seven glide-stick positions of the SRC adding stages A and B in an ordinary consecutive sequence 0 through 6 from top to bottom. The number sequence associated with the glide-stick positions of the SRC multiplying stage C taken from top to bottom runs through a sequence which corresponds to line $p=7$ of the index table, with the exception of "0" which is associated with the half-step positioning marking 370. The number sequence associated with the glide-stick positioning markings of the SRC division stage D taken from bottom to top runs through a sequence which corresponds to line $l=7$ of the index table, with the exception of the numeric value "0" which is associated with the half-step positioning marking 430.

In order to demonstrate a corollary, it may be assumed that the variable $c$ stands for the index relation $c=g^{v}$ (mod 7) with the smallest primitive root $g=3$ of the prime $p=7$. By renumbering the positioning markings 371 through 376 of glide-stick 357 in accordance with the index $v=g_{\text{ind } c}$, it results in the glide-stick positions of stage C, which are associated with the index values $v$, carrying consecutive number sequences.

The mode of operation of the subject multi-stage SRC arithmetic unit modulo 7 is now demonstrated by an example; it is assumed that the variables have the numeric values $a=3$, $b=5$, $c=2$ and $d=5$. Read-in of said values is done by proper positioning of the respective glide-sticks in each stage. The glide-sticks depicted in FIG. 10 are shown in positions corresponding to the chosen numeric values.

By closing switch 302, a unique current path is established as follows: plus terminal of battery 301, switch 302, input terminal 303, conductive portion 309 of glide-stick 307, terminal 323 of stage A, slip-bar 353, brush 339, terminal 361 of stage B, slip-bar 391, brush 384, contact 416, terminal 403 of stage C, slip-bar 413, terminal 403 of stage C, slip-bar 453, brush 446, contact 464, interchange-box 450, output terminal 304–6, lamp 305–6, conductor 306, and minus terminal of battery 301. The lamp 305–6 is turned on and thereby, for example, by illuminating a suitably associated number plate, indicates the result of the performed SRC calculation $(3+5)\cdot 2/5\equiv 6$ (mod 7).

It should be appreciated that an adequate design of the present multi-stage SRC arithmetic unit would comprise an axially symmetrical arrangement utilizing circular slip-rings rather than rectilinear slip-bars. In FIG. 10 rectilinear slip-bars have been shown for the sake of descriptive clearness and simplicity.

Although the various embodiments of the present invention described in the foregoing, pertain to SRC arithmetic units operating modulo distinct prime numbers $p$, it is obvious that one skilled in the art will be able, by consequent application of the examples shown in the foregoing, to design SRC arithmetic units for any other prime numbers. A plurality of SRC arithmetic units as described here for different primes $p_i$ will have to be used in a SRC computing system. The parallel operation of these units for performing SRC computations on ordinary numbers of any chosen magnitude does not impose any limitation on the subject and scope of the present invention.

While the invention has been particularly shown and described with reference to preferred embodiments thereof, it will be understood by those skilled in the art that various changes in form and details may be made therein without departing from the spirit and scope of the invention.

What is claimed is:

1. An arithmetic unit for processing two applied operand signals, each represented in the System of Residual Classes by residues of a plurality of different data moduli, to develop a result comprising, in combination:

a plurality of first operand conversion means, one for each of said data moduli, and each responsive to one of the residue signals representing the first operand for developing a corresponding first operand index signal;

a plurality of second operand conversion means, one for each of said data moduli, and each responsive to one of the residue signals representing the second operand for developing a corresponding second operand index signal;

a plurality of adders, one for each of said data moduli, and each responsive to the corresponding first and second operand index signals for adding said index signals to develop a result index signal, where each addition is performed at a different modulus, each of which is one less than the corresponding data modulus;

and a plurality of result conversion means, one for each of said data moduli, and each responsive to one of the correspondig result index signals for developing a result residue signal.

2. An arithmetic unit for processing two applied operand signals, each represented in the System of Residual Classes by residues of a plurality of different data moduli, to develop a result comprising, in combination:

a plurality of first operand conversion means, one for each of said data moduli, and each responsive to one of the residue signals representing the first operand for developing a corresponding first operand index signal;

a plurality of second operand conversion means, one for each of said data moduli, and each responsive to one of the residue signals representing operand for developing a corresponding second operand index signal;

a plurality of subtracters, one for each of said data moduli, and each responsive to the corresponding first and second operand index signals for subtracting said index signals to develop a result index signal, where each subtraction is performed at a different modulus, each of which is one less than the corresponding data modulus;

and a plurality of result conversion means, one for each of said data moduli, and each responsive to one of the corresponding result index signals for developing a result residue signal.

References Cited in the file of this patent

UNITED STATES PATENTS

| | | |
|---|---|---|
| 2,697,549 | Hobbs | Dec. 21, 1954 |
| 3,081,032 | Keir et al. | Mar. 12, 1963 |

OTHER REFERENCES

Vinogradov: Elements of Number Theory, Dover Publications, 920 Broadway, Department TF1, New York 10, N.Y., pages 105 to 121 relied on. (Copyright 1954.)